(12) United States Patent
Zhang

(10) Patent No.: US 10,356,833 B2
(45) Date of Patent: Jul. 16, 2019

(54) RESOURCE ALLOCATION METHOD, RESOURCE CONTENTION METHOD, AND RELATED APPARATUS

(71) Applicant: Huawei Technologies Co., Ltd., Shenzhen, Guangdong (CN)

(72) Inventor: Xingwei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 15/295,049

(22) Filed: Oct. 17, 2016

(65) Prior Publication Data
US 2017/0034863 A1    Feb. 2, 2017

Related U.S. Application Data

(63) Continuation of application No. PCT/CN2014/075692, filed on Apr. 18, 2014.

(51) Int. Cl.
*H04W 74/00* (2009.01)
*H04W 76/14* (2018.01)
(Continued)

(52) U.S. Cl.
CPC ....... *H04W 76/14* (2018.02); *H04W 72/0446* (2013.01); *H04W 74/002* (2013.01); *H04W 74/08* (2013.01)

(58) Field of Classification Search
CPC .............. H04W 76/14; H04W 76/023; H04W 72/0446; H04W 74/08; H04W 74/002
See application file for complete search history.

(56) References Cited

U.S. PATENT DOCUMENTS

| 5,289,463 A * | 2/1994 | Mobasser | H04L 12/5602 370/230 |
| 8,650,640 B2 * | 2/2014 | Calcaterra | G06F 21/74 726/23 |

(Continued)

FOREIGN PATENT DOCUMENTS

| CN | 103517371 A | 1/2014 |
| CN | 103686753 A | 3/2014 |

(Continued)

OTHER PUBLICATIONS

Intel Corporation; "On medium access control for D2D broadcast communication"; 3GPP TSG-RAN WG2 Meeting #84; R2-134292; San Francisco, USA; Nov. 11-15, 2013; 6 pages.

(Continued)

*Primary Examiner* — Lan-Huong Truong

(57) ABSTRACT

The present invention discloses a resource allocation method, a resource contention method, and a related apparatus, so as to resolve a problem, in a contention-based distributed resource reuse method in the prior art, that a delay in obtaining an available resource by UE is long. The method in the present invention includes: sending, by a first terminal, declaration information used to indicate an available resource; receiving, by the first terminal, resource request information sent by at least one second terminal according to the declaration information; and sending, by the first terminal, response information, where the response information includes an identification of at least one third terminal, so as to instruct the at least one third terminal to use the available resource, and the at least one third terminal is selected from the at least one second terminal.

17 Claims, 10 Drawing Sheets

(51) Int. Cl.
*H04W 74/08* (2009.01)
*H04W 72/04* (2009.01)

(56) References Cited

U.S. PATENT DOCUMENTS

| | | | | |
|---|---|---|---|---|
| 2010/0165882 | A1* | 7/2010 | Palanki | H04W 76/14 370/254 |
| 2010/0254404 | A1 | 10/2010 | Cordeiro et al. | |
| 2011/0292895 | A1* | 12/2011 | Wager | H04L 5/0007 370/329 |
| 2012/0063409 | A1 | 3/2012 | Novak et al. | |
| 2012/0163278 | A1* | 6/2012 | Chang | H04L 12/189 370/312 |
| 2012/0322484 | A1* | 12/2012 | Yu | H04W 4/08 455/509 |
| 2014/0094183 | A1 | 4/2014 | Gao et al. | |
| 2015/0327315 | A1* | 11/2015 | Xue | H04L 5/0044 370/330 |
| 2017/0013656 | A1* | 1/2017 | Van Phan | H04W 76/14 |
| 2017/0079016 | A1* | 3/2017 | Nord | H04W 72/042 |
| 2018/0063878 | A1* | 3/2018 | Amerga | H04W 76/14 |

FOREIGN PATENT DOCUMENTS

| | | |
|---|---|---|
| JP | 2012523200 A | 9/2012 |
| WO | 2013/062310 A1 | 5/2013 |

OTHER PUBLICATIONS

Panasonic, "Consideration on contention based and scheduling based resource allocation schemes in D2D", 3GPP TSG RAN WG1 Meeting #75, Nov. 11-15, 2013, 4 pages, R1-135400.

Samsung, "Resource allocation for D2D broadcast communication", 3GPP TSG RAN WG1 Meeting #76, 5 pages, R1-140390.

Huawei, HiSilicon, "Consideration on Mode 2 resource allocation", 3GPP TSG RAN WG1 Meeting #76bis, Mar. 31-Apr. 1, 2014, 3 pages, R1-141593.

Kyocera, "Resource allocation schemes for D2D communication," R2-134311, 3GPP TSG-RAN WG2 #84, San Francisco, USA, Nov. 11-15, 2013, 11 pages.

ETRI, "Transmission resource handling for out-of-coverage," R2-140264, 3GPP TSG-RAN WG2 #85, Prague, Czech Republic, Feb. 10-14, 2014, 3 pages.

* cited by examiner

RESOURCE ALLOCATION METHOD, RESOURCE CONTENTION METHOD, AND RELATED APPARATUS

CROSS-REFERENCE TO RELATED APPLICATIONS

This application is a continuation of International Application No. PCT/CN2014/075692, filed on Apr. 18, 2014, the disclosure of which is hereby incorporated by reference in its entirety.

TECHNICAL FIELD

The present invention relates to the field of communications technologies, and in particular, to a resource allocation method, a resource contention method, and a related apparatus.

BACKGROUND

A 3rd Generation Partnership Project (3GPP) Long Term Evolution Advanced (LTE-A) Rel-10/11/12 is an advance on a Long Term Evolution (LTE) Rel-8/9 release, and an LTE-A system has a bandwidth requirement higher than a bandwidth requirement of an LTE system, and supports a peak data rate up to 1 G/s downlink and 500 M/s uplink. To meet a requirement of LTE-A, in the LTE-A system, a carrier aggregation (CA) technology is used as a method for expanding system bandwidth of the LTE-A system, and a multiple-antenna enhancement technology (multiple-input multiple-output MIMO) and a coordinated multipoint technology (CoMP) are used to improve a data rate and system performance.

In the LTE-A, various technologies are used to improve the data rate. However, with rapid development of wireless communications and generation of ultra-high rate traffic (such as a high-definition video), a wireless communications network has increasingly heavy load. How to alleviate network load becomes a hot research topic. Device-to-device (D2D) communication emerges, and becomes a major project of the LTE-A Rel-12 release. In this communications mode, user equipment (UE) may directly communicate without a need of an evolved NodeB (eNB) for forwarding; therefore, data load of the eNB is shared. In the D2D communication, a spectrum resource can be better used, spectrum utilization and a data rate are improved, and a burden on the eNB is alleviated.

In the current D2D communication, there is a contention-based distributed resource reuse method, where UE obtains a resource from a resource pool by means of contention. First, there is a predefined resource contention period, and if the UE wants to obtain a resource, the UE needs to listen for an available resource, that is, a resource in an idle state, in the resource contention period. If the UE detects the available resource by means of listening, the UE may attempt to send data in a next resource contention period on the available resource detected by means of listening. If no conflict occurs (that is, no another UE sends data on the available resource), the UE obtains the resource by means of contention; a user who obtains the resource by means of contention may send data on the resource in consecutive several resource contention periods, and in this case, another UE learns, by means of listening, that the resource is in an occupied (non-idle) state; and the resource is not released back to the resource pool until the UE stops sending data in a resource contention period.

From starting to listen for an available resource, to participating in resource contention, and then to obtaining a resource, it takes each UE a long time, which indicates a long contention-based access time; therefore, if a large quantity of UEs contends for a resource, a conflict probability is high, and UE needs to perform contention for many times to obtain an available resource, which leads to a long delay in obtaining the available resource by the UE.

SUMMARY

Embodiments of the present invention provide a resource allocation method, a resource contention method, and a related apparatus, so as to resolve a problem, in a contention-based distributed resource reuse method in the prior art, that a delay in obtaining an available resource by UE is long.

A first aspect provides a first terminal that is applied to device-to-device D2D communication and includes:

a declaration information sending unit, configured to send declaration information used to indicate an available resource;

a resource request information receiving unit, configured to receive resource request information sent by at least one second terminal according to the declaration information sent by the declaration information sending unit; and a response information sending unit, configured to send response information, where the response information includes an identification of at least one third terminal, so as to instruct the at least one third terminal to use the available resource, and the at least one third terminal is selected from the at least one second terminal that sends the resource request information received by the resource request information receiving unit.

With reference to the first aspect, in a first implementation manner, the available resource is a resource obtained by the first terminal by means of contention.

With reference to the first aspect or the first implementation manner of the first aspect, in a second implementation manner, the declaration information sending unit is specifically configured to:

when it is determined that the available resource needs to be transferred, send the declaration information by using the available resource.

With reference to the first aspect, the first implementation manner of the first aspect, or the second implementation manner of the first aspect, in a third implementation manner, the declaration information includes an identification of the first terminal.

With reference to the first aspect, the first implementation manner of the first aspect, the second implementation manner of the first aspect, or the third implementation manner of the first aspect, in a fourth implementation manner, the declaration information further includes a resource location and a resource size of the available resource.

With reference to the first aspect, the first implementation manner of the first aspect, the second implementation manner of the first aspect, the third implementation manner of the first aspect, or the fourth implementation manner of the first aspect, in a fifth implementation manner, the resource request information includes an identification of the second terminal that requests a resource.

With reference to the first aspect, the first implementation manner of the first aspect, the second implementation manner of the first aspect, the third implementation manner of the first aspect, the fourth implementation manner of the first aspect, or the fifth implementation manner of the first aspect, in a sixth implementation manner, the resource request information further includes a size of the available resource requested by the second terminal.

With reference to the first aspect, the first implementation manner of the first aspect, the second implementation manner of the first aspect, the third implementation manner of the first aspect, the fourth implementation manner of the first aspect, the fifth implementation manner of the first aspect, or the sixth implementation manner of the first aspect, in a seventh implementation manner, the resource request information receiving unit is specifically configured to:

receive, on a resource request channel, the resource request information sent by the at least one second terminal according to the declaration information sent by the declaration information sending unit, where the resource request channel is a dedicated channel that is used to transmit only resource request information and that is specified in advance.

With reference to the seventh implementation manner of the first aspect, in an eighth implementation manner, the resource request channel is located in the first or the last subframe of each resource contention period, and the available resource is located in a subframe of the resource contention period except the first or the last subframe.

With reference to the seventh implementation manner of the first aspect, in a ninth implementation manner, the resource request information receiving unit is specifically configured to:

receive resource request information that carries the identification of the first terminal and is sent by the at least one second terminal according to the declaration information sent by the declaration information sending unit.

With reference to the first aspect, the first implementation manner of the first aspect, the second implementation manner of the first aspect, the third implementation manner of the first aspect, the fourth implementation manner of the first aspect, the fifth implementation manner of the first aspect, or the sixth implementation manner of the first aspect, in a tenth implementation manner, the resource request information receiving unit is specifically configured to:

receive, on a resource request channel, the resource request information sent by the at least one second terminal according to the declaration information sent by the declaration information sending unit, where the resource request channel is located on the available resource.

With reference to the tenth implementation manner of the first aspect, in an eleventh implementation manner, that the resource request channel is located on the available resource specifically includes:

the resource request channel is located on the available resource in a next resource contention period adjacent to a current resource contention period.

With reference to the seventh implementation manner of the first aspect, the eighth implementation manner of the first aspect, the ninth implementation manner of the first aspect, the tenth implementation manner of the first aspect, or the eleventh implementation manner of the first aspect, in a twelfth implementation manner, the resource request channel is divided into at least two sub-channels, and each sub-channel is used by one second terminal to send the resource request information.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, the seventh implementation manner of the first aspect, the eighth implementation manner of the first aspect, the ninth implementation manner of the first aspect, the tenth implementation manner of the first aspect, the eleventh implementation manner of the first aspect, or the twelfth implementation manner of the first aspect, in a thirteenth implementation manner, the response information sending unit is specifically configured to:

send the response information by using the available resource.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, the seventh implementation manner of the first aspect, the eighth implementation manner of the first aspect, or the ninth implementation manner of the first aspect, in a fourteenth implementation manner, the response information sending unit is specifically configured to:

send the response information on the available resource in a next resource contention period adjacent to a current resource contention period.

With reference to the tenth implementation manner of the first aspect or the eleventh implementation manner of the first aspect, in a fifteenth implementation manner, the declaration information sending unit is specifically configured to:

send the response information on the available resource in a next resource contention period of an adjacent resource contention period of the current resource contention period.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, the seventh implementation manner of the first aspect, the eighth implementation manner of the first aspect, the ninth implementation manner of the first aspect, the tenth implementation manner of the first aspect, the eleventh implementation manner of the first aspect, the twelfth implementation manner of the first aspect, the thirteenth implementation manner of the first aspect, the fourteenth implementation manner of the first aspect, or the fifteenth implementation manner of the first aspect, in a sixteenth implementation manner, there are at least two third terminals; and the response information further includes:

resource sizes and resource locations of available resources separately allocated to the at least two third terminals.

A second aspect provides a second terminal that is applied to device-to-device D2D communication and includes:

a declaration information receiving unit, configured to receive declaration information that is used to indicate an available resource and sent by a first terminal;

a resource request information sending unit, configured to send resource request information to the first terminal according to the declaration information received by the declaration information receiving unit, so that the first terminal can allocate the available resource to the second terminal;

a response information receiving unit, configured to receive response information sent by the first terminal, where the response information includes an identification of at least one third terminal selected by the first terminal from at least one second terminal that sends resource request information; and an available resource use permission determining unit, configured to determine, by determining whether an identification of the second terminal matches the identification that is of the at least one third terminal and included in the response information receiving unit, whether the second terminal can use the available resource.

With reference to the second aspect, in a first implementation manner, the available resource is a resource obtained by the first terminal by means of contention.

With reference to the second aspect or the first implementation manner of the second aspect, in a second implementation manner, the declaration information includes an identification of the first terminal.

With reference to the second aspect, the first implementation manner of the second aspect, or the second implementation manner of the second aspect, in a third implementation manner, the declaration information further includes a resource location and a resource size of the available resource.

With reference to the second aspect, the first implementation manner of the second aspect, the second implementation manner of the second aspect, or the third implementation manner of the second aspect, in a fourth implementation manner, the resource request information includes the identification of the second terminal.

With reference to the second aspect, the first implementation manner of the second aspect, the second implementation manner of the second aspect, the third implementation manner of the second aspect, or the fourth implementation manner of the second aspect, in a fifth implementation manner, the resource request information further includes a size of the available resource requested by the second terminal.

With reference to the second aspect, the first implementation manner of the second aspect, the second implementation manner of the second aspect, the third implementation manner of the second aspect, the fourth implementation manner of the second aspect, or the fifth implementation manner of the second aspect, in a sixth implementation manner, the resource request information sending unit is specifically configured to:

send the resource request information to the first terminal on a resource request channel according to the declaration information received by the declaration information receiving unit, where the resource request channel is a dedicated channel that is used to transmit only resource request information and that is specified in advance.

With reference to the sixth implementation manner of the second aspect, in a seventh implementation manner, the resource request channel is located in the first or the last subframe of each resource contention period, and the available resource is located in a subframe of the resource contention period except the first or the last subframe.

With reference to the sixth implementation manner of the second aspect, in an eighth implementation manner, the resource request information sending unit is specifically configured to:

send, to the first terminal according to the declaration information received by the declaration information receiving unit, resource request information that carries the identification of the first terminal.

With reference to the second aspect, the first implementation manner of the second aspect, the second implementation manner of the second aspect, the third implementation manner of the second aspect, the fourth implementation manner of the second aspect, or the fifth implementation manner of the second aspect, in a ninth implementation manner, the resource request information sending unit is specifically configured to:

send the resource request information to the first terminal on a resource request channel according to the declaration information received by the declaration information receiving unit, where the resource request channel is located on the available resource.

With reference to the ninth implementation manner of the second aspect, in a tenth implementation manner, that the resource request channel is located on the available resource specifically includes:

the resource request channel is located on the available resource in a next resource contention period adjacent to a current resource contention period.

With reference to the sixth implementation manner of the second aspect, the seventh implementation manner of the second aspect, the eighth implementation manner of the second aspect, the ninth implementation manner of the second aspect, or the tenth implementation manner of the second aspect, in an eleventh manner, the resource request channel is divided into at least two sub-channels, and each sub-channel is used by one second terminal to send the resource request information.

With reference to the second aspect, the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, the seventh implementation manner of the second aspect, the eighth implementation manner of the second aspect, the ninth implementation manner of the second aspect, the tenth implementation manner of the second aspect, or the eleventh implementation manner of the second aspect, in a twelfth manner, the response information sending unit is specifically configured to:

receive, by using the available resource, the response information sent by the first terminal.

With reference to the second aspect, the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, the seventh implementation manner of the second aspect, or the eighth implementation manner of the second aspect, in a thirteenth manner, the response information receiving unit is specifically configured to:

receive, on the available resource in a next resource contention period adjacent to a current resource contention period, the response information sent by the first terminal.

With reference to the tenth implementation manner of the second aspect, in a fourteenth manner, the response information receiving unit is specifically configured to:

receive, on the available resource in a next resource contention period of an adjacent resource contention period of the current resource contention period, the response information sent by the first terminal.

A third aspect provides a first terminal that is applied to device-to-device D2D communication and includes:

a processor, a memory, and a communications bus, where both the processor and the memory are connected to the communications bus; where the memory is connected to the processor, and stores program code executed by the processor; and the processor is connected to the memory, and is configured to: send declaration information used to indicate an available resource; receive resource request information sent by at least one second terminal according to the declaration information; and send response information, where the response information includes an identification of at least one third terminal, so as to instruct the at least one third terminal to use the available resource, and the at least one third terminal is selected from the at least one second terminal.

With reference to the third aspect, in a first implementation manner, the available resource is a resource obtained by the first terminal by means of contention.

With reference to the third aspect or the first implementation manner of the third aspect, in a second implementation manner, the processor is specifically configured to:

when it is determined that the available resource needs to be transferred, send the declaration information by using the available resource.

With reference to the third aspect, the first implementation manner of the third aspect, or the second implementation manner of the third aspect, in a third implementation manner, the declaration information includes an identification of the first terminal.

With reference to the third aspect, the first implementation manner of the third aspect, the second implementation manner of the third aspect, or the third implementation manner of the third aspect, in a fourth implementation manner, the declaration information further includes a resource location and a resource size of the available resource.

With reference to the third aspect, the first implementation manner of the third aspect, the second implementation manner of the third aspect, the third implementation manner of the third aspect, or the fourth implementation manner of the third aspect, in a fifth implementation manner, the resource request information includes an identification of the second terminal that requests a resource.

With reference to the third aspect, the first implementation manner of the third aspect, the second implementation manner of the third aspect, the third implementation manner of the third aspect, the fourth implementation manner of the third aspect, or the fifth implementation manner of the third aspect, in a sixth implementation manner, the resource request information further includes a size of the available resource requested by the second terminal.

With reference to the third aspect, the first implementation manner of the third aspect, the second implementation manner of the third aspect, the third implementation manner of the third aspect, the fourth implementation manner of the third aspect, the fifth implementation manner of the third aspect, or the sixth implementation manner of the third aspect, in a seventh implementation manner, the processor is specifically configured to:

receive, on a resource request channel, the resource request information sent by the at least one second terminal according to the declaration information, where the resource request channel is a dedicated channel that is used to transmit only resource request information and that is specified in advance.

With reference to the seventh implementation manner of the third aspect, in an eighth implementation manner, the resource request channel is located in the first or the last subframe of each resource contention period, and the available resource is located in a subframe of the resource contention period except the first or the last subframe.

With reference to the seventh implementation manner of the third aspect, in a ninth implementation manner, the processor is specifically configured to:

receive resource request information that carries the identification of the first terminal and is sent by the at least one second terminal according to the declaration information.

With reference to the third aspect, the first implementation manner of the third aspect, the second implementation manner of the third aspect, the third implementation manner of the third aspect, the fourth implementation manner of the third aspect, the fifth implementation manner of the third aspect, or the sixth implementation manner of the third aspect, in a tenth implementation manner, the processor is specifically configured to:

receive, on a resource request channel, the resource request information sent by the at least one second terminal according to the declaration information, where the resource request channel is located on the available resource.

With reference to the tenth implementation manner of the third aspect, in an eleventh implementation manner, that the resource request channel is located on the available resource specifically includes:

the resource request channel is located on the available resource in a next resource contention period adjacent to a current resource contention period.

With reference to the seventh implementation manner of the third aspect, the eighth implementation manner of the third aspect, the ninth implementation manner of the third aspect, the tenth implementation manner of the third aspect, or the eleventh implementation manner of the third aspect, in a twelfth implementation manner, the resource request channel is divided into at least two sub-channels, and each sub-channel is used by one second terminal to send the resource request information.

With reference to the third aspect, the first implementation manner of the third aspect, the second implementation manner of the third aspect, the third implementation manner of the third aspect, the fourth implementation manner of the third aspect, the fifth implementation manner of the third aspect, the sixth implementation manner of the third aspect, the seventh implementation manner of the third aspect, the eighth implementation manner of the third aspect, the ninth implementation manner of the third aspect, the tenth implementation manner of the third aspect, the eleventh implementation manner of the third aspect, or the twelfth implementation manner of the third aspect, in a thirteenth implementation manner, the processor is specifically configured to:

send the response information by using the available resource.

With reference to the third aspect, the first implementation manner of the third aspect, the second implementation manner of the third aspect, the third implementation manner of the third aspect, the fourth implementation manner of the third aspect, the fifth implementation manner of the third aspect, the sixth implementation manner of the third aspect, the seventh implementation manner of the third aspect, the eighth implementation manner of the third aspect, or the ninth implementation manner of the third aspect, in a fourteenth implementation manner, the processor is specifically configured to:

send the response information on the available resource in a next resource contention period adjacent to a current resource contention period.

With reference to the tenth implementation manner of the third aspect or the eleventh implementation manner of the third aspect, in a fifth implementation manner, the processor is specifically configured to:

send the response information on the available resource in a next resource contention period of an adjacent resource contention period of the current resource contention period.

With reference to the third aspect, the first implementation manner of the third aspect, the second implementation manner of the third aspect, the third implementation manner of the third aspect, the fourth implementation manner of the third aspect, the fifth implementation manner of the third aspect, the sixth implementation manner of the third aspect, the seventh implementation manner of the third aspect, the eighth implementation manner of the third aspect, the ninth implementation manner of the third aspect, the tenth implementation manner of the third aspect, the eleventh implementation manner of the third aspect, the twelfth implementation manner of the third aspect, the thirteenth implementation manner of the third aspect, the fourteenth implementation manner of the third aspect, or the fifteenth implementation manner of the third aspect, in a sixteenth implementation manner, there are at least two third terminals; and the response information further includes:

resource sizes and resource locations of available resources separately allocated to the at least two third terminals.

A fourth aspect provides a second terminal that is applied to device-to-device D2D communication and includes:

a processor, a memory, and a communications bus, where both the processor and the memory are connected to the communications bus; where the memory is connected to the processor, and stores program code executed by the processor; and the processor is connected to the memory, and is configured to: receive declaration information that is used to indicate an available resource and sent by a first terminal; send resource request information to the first terminal according to the declaration information, so that the first terminal can allocate the available resource to the second terminal; receive response information sent by the first terminal, where the response information includes an identification of at least one third terminal selected by the first terminal from at least one second terminal that sends resource request information; and determine, by determining whether an identification of the second terminal matches the identification of the at least one third terminal, whether the second terminal can use the available resource.

With reference to the fourth aspect, in a first implementation manner, the available resource is a resource obtained by the first terminal by means of contention.

With reference to the fourth aspect or the first implementation manner of the fourth aspect, in a second implementation manner, the declaration information includes an identification of the first terminal.

With reference to the fourth aspect, the first implementation manner of the fourth aspect, or the second implementation manner of the fourth aspect, in a third implementation manner, the declaration information further includes a resource location and a resource size of the available resource.

With reference to the fourth aspect, the first implementation manner of the fourth aspect, the second implementation manner of the fourth aspect, or the third implementation manner of the fourth aspect, in a fourth implementation manner, the resource request information includes the identification of the second terminal.

With reference to the fourth aspect, the first implementation manner of the fourth aspect, the second implementation manner of the fourth aspect, the third implementation manner of the fourth aspect, or the fourth implementation manner of the fourth aspect, in a fifth implementation manner, the resource request information further includes a size of the available resource requested by the second terminal.

With reference to the fourth aspect, the first implementation manner of the fourth aspect, the second implementation manner of the fourth aspect, the third implementation manner of the fourth aspect, the fourth implementation manner of the fourth aspect, or the fifth implementation manner of the fourth aspect, in a sixth implementation manner, the processor is specifically configured to:

send the resource request information to the first terminal on a resource request channel according to the declaration information, where the resource request channel is a dedicated channel that is used to transmit only resource request information and that is specified in advance.

With reference to the sixth implementation manner of the fourth aspect, in a seventh implementation manner, the resource request channel is located in the first or the last subframe of each resource contention period, and the available resource is located in a subframe of the resource contention period except the first or the last subframe.

With reference to the sixth implementation manner of the fourth aspect, in an eighth implementation manner, the processor is specifically configured to:

send, to the first terminal according to the declaration information, resource request information that carries the identification of the first terminal.

With reference to the fourth aspect, the first implementation manner of the fourth aspect, the second implementation manner of the fourth aspect, the third implementation manner of the fourth aspect, the fourth implementation manner of the fourth aspect, or the fifth implementation manner of the fourth aspect, in a ninth implementation manner, the processor is specifically configured to:

send the resource request information to the first terminal on a resource request channel according to the declaration information, where the resource request channel is located on the available resource.

With reference to the ninth implementation manner of the fourth aspect, in a tenth implementation manner, that the resource request channel is located on the available resource specifically includes:

the resource request channel is located on the available resource in a next resource contention period adjacent to a current resource contention period.

With reference to the sixth implementation manner of the fourth aspect, the seventh implementation manner of the fourth aspect, the eighth implementation manner of the fourth aspect, the ninth implementation manner of the fourth aspect, or the tenth implementation manner of the fourth aspect, in an eleventh manner, the resource request channel is divided into at least two sub-channels, and each sub-channel is used by one second terminal to send the resource request information.

With reference to the fourth aspect, the first implementation manner of the fourth aspect, the second implementation manner of the fourth aspect, the third implementation manner of the fourth aspect, the fourth implementation manner of the fourth aspect, the fifth implementation manner of the fourth aspect, the sixth implementation manner of the fourth aspect, the seventh implementation manner of the fourth aspect, the eighth implementation manner of the fourth aspect, the ninth implementation manner of the fourth aspect, the tenth implementation manner of the fourth aspect, or the eleventh implementation manner of the fourth aspect, in a twelfth manner, the processor is specifically configured to:

receive, by using the available resource, the response information sent by the first terminal.

With reference to the fourth aspect, the first implementation manner of the fourth aspect, the second implementation manner of the fourth aspect, the third implementation manner of the fourth aspect, the fourth implementation manner of the fourth aspect, the fifth implementation manner of the fourth aspect, the sixth implementation manner of the fourth aspect, the seventh implementation manner of the fourth aspect, or the eighth implementation manner of the fourth aspect, in a thirteenth manner, the processor is specifically configured to:

receive, on the available resource in a next resource contention period adjacent to a current resource contention period, the response information sent by the first terminal.

With reference to the tenth implementation manner of the fourth aspect, in a fourteenth manner, the processor is specifically configured to:

receive, on the available resource in a next resource contention period of an adjacent resource contention period of the current resource contention period, the response information sent by the first terminal.

A fifth aspect provides a resource allocation method that is applied to device-to-device D2D communication and includes:

sending, by a first terminal, declaration information used to indicate an available resource;

receiving, by the first terminal, resource request information sent by at least one second terminal according to the declaration information; and sending, by the first terminal, response information, where the response information includes an identification of at least one third terminal, so as to instruct the at least one third terminal to use the available resource, and the at least one third terminal is selected from the at least one second terminal.

With reference to the fifth aspect, in a first implementation manner, the available resource is a resource obtained by the first terminal by means of contention.

With reference to the fifth aspect or the first implementation manner of the fifth aspect, in a second implementation manner, the sending, by a first terminal, declaration information used to indicate an available resource specifically includes:

when it is determined that the available resource needs to be transferred, sending, by the first terminal, the declaration information by using the available resource.

With reference to the fifth aspect, the first implementation manner of the fifth aspect, or the second implementation manner of the fifth aspect, in a third implementation manner, the declaration information includes an identification of the first terminal.

With reference to the fifth aspect, the first implementation manner of the fifth aspect, the second implementation manner of the fifth aspect, or the third implementation manner of the fifth aspect, in a fourth implementation manner, the declaration information further includes a resource location and a resource size of the available resource.

With reference to the fifth aspect, the first implementation manner of the fifth aspect, the second implementation manner of the fifth aspect, the third implementation manner of the fifth aspect, or the fourth implementation manner of the fifth aspect, in a fifth implementation manner, the resource request information includes an identification of the second terminal that requests a resource.

With reference to the fifth aspect, the first implementation manner of the fifth aspect, the second implementation manner of the fifth aspect, the third implementation manner of the fifth aspect, the fourth implementation manner of the fifth aspect, or the fifth implementation manner of the fifth aspect, in a sixth implementation manner, the resource request information further includes a size of the available resource requested by the second terminal.

With reference to the fifth aspect, the first implementation manner of the fifth aspect, the second implementation manner of the fifth aspect, the third implementation manner of the fifth aspect, the fourth implementation manner of the fifth aspect, the fifth implementation manner of the fifth aspect, or the sixth implementation manner of the fifth aspect, in a seventh implementation manner, the receiving, by the first terminal, resource request information sent by at least one second terminal according to the declaration information specifically includes:

receiving, by the first terminal on a resource request channel, the resource request information sent by the at least one second terminal according to the declaration information, where the resource request channel is a dedicated channel that is used to transmit only resource request information and that is specified in advance.

With reference to the seventh implementation manner of the fifth aspect, in an eighth implementation manner, the resource request channel is located in the first or the last subframe of each resource contention period, and the available resource is located in a subframe of the resource contention period except the first or the last subframe.

With reference to the seventh implementation manner of the fifth aspect, in a ninth implementation manner, the receiving, by the first terminal, resource request information sent by at least one second terminal according to the declaration information includes:

receiving, by the first terminal, resource request information that carries the identification of the first terminal and is sent by the at least one second terminal according to the declaration information.

With reference to the fifth aspect, the first implementation manner of the fifth aspect, the second implementation manner of the fifth aspect, the third implementation manner of the fifth aspect, the fourth implementation manner of the fifth aspect, the fifth implementation manner of the fifth aspect, or the sixth implementation manner of the fifth aspect, in a tenth implementation manner, the receiving, by the first terminal, resource request information sent by at least one second terminal according to the declaration information specifically includes:

receiving, by the first terminal on a resource request channel, the resource request information sent by the at least one second terminal according to the declaration information, where the resource request channel is located on the available resource.

With reference to the tenth implementation manner of the fifth aspect, in an eleventh implementation manner, that the resource request channel is located on the available resource specifically includes:

the resource request channel is located on the available resource in a next resource contention period adjacent to a current resource contention period.

With reference to the seventh implementation manner of the fifth aspect, the eighth implementation manner of the fifth aspect, the ninth implementation manner of the fifth aspect, the tenth implementation manner of the fifth aspect, or the eleventh implementation manner of the fifth aspect, in a twelfth implementation manner, the resource request channel is divided into at least two sub-channels, and each sub-channel is used by one second terminal to send the resource request information.

With reference to the fifth aspect, the first implementation manner of the fifth aspect, the second implementation manner of the fifth aspect, the third implementation manner of the fifth aspect, the fourth implementation manner of the fifth aspect, the fifth implementation manner of the fifth aspect, the sixth implementation manner of the fifth aspect, the seventh implementation manner of the fifth aspect, the eighth implementation manner of the fifth aspect, the ninth implementation manner of the fifth aspect, the tenth implementation manner of the fifth aspect, the eleventh implementation manner of the fifth aspect, or the twelfth implementation manner of the fifth aspect, in a thirteenth implementation manner, the sending, by the first terminal, response information specifically includes:

sending, by the first terminal, the response information by using the available resource.

With reference to the fifth aspect, the first implementation manner of the fifth aspect, the second implementation manner of the fifth aspect, the third implementation manner of the fifth aspect, the fourth implementation manner of the fifth aspect, the fifth implementation manner of the fifth aspect, the sixth implementation manner of the fifth aspect, the seventh implementation manner of the fifth aspect, the eighth implementation manner of the fifth aspect, or the ninth implementation manner of the fifth aspect, in a fourteenth implementation manner, the sending, by the first terminal, response information specifically includes:

sending, by the first terminal, the response information on the available resource in a next resource contention period adjacent to a current resource contention period.

With reference to the tenth implementation manner of the fifth aspect or the eleventh implementation manner of the fifth aspect, in a fifteenth implementation manner, the sending, by the first terminal, response information specifically includes:

sending, by the first terminal, the response information on the available resource in a next resource contention period of an adjacent resource contention period of the current resource contention period.

With reference to the fifth aspect, the first implementation manner of the fifth aspect, the second implementation manner of the fifth aspect, the third implementation manner of the fifth aspect, the fourth implementation manner of the fifth aspect, the fifth implementation manner of the fifth aspect, the sixth implementation manner of the fifth aspect, the seventh implementation manner of the fifth aspect, the eighth implementation manner of the fifth aspect, the ninth implementation manner of the fifth aspect, the tenth implementation manner of the fifth aspect, the eleventh implementation manner of the fifth aspect, the twelfth implementation manner of the fifth aspect, the thirteenth implementation manner of the fifth aspect, the fourteenth implementation manner of the fifth aspect, or the fifteenth implementation manner of the fifth aspect, in a sixteenth implementation manner, there are at least two third terminals; and the response information further includes:

resource sizes and resource locations of available resources separately allocated to the at least two third terminals.

A sixth aspect provides a resource contention method that is applied to device-to-device D2D communication and includes:

receiving, by a second terminal, declaration information that is used to indicate an available resource and sent by a first terminal;

sending, by the second terminal, resource request information to the first terminal according to the declaration information, so that the first terminal can allocate the available resource to the second terminal;

receiving, by the second terminal, response information sent by the first terminal, where the response information includes an identification of at least one third terminal selected by the first terminal from at least one second terminal that sends resource request information; and determining, by the second terminal by determining whether an identification of the second terminal matches the identification of the at least one third terminal, whether the second terminal can use the available resource.

With reference to the sixth aspect, in a first implementation manner, the available resource is a resource obtained by the first terminal by means of contention.

With reference to the sixth aspect or the first implementation manner of the sixth aspect, in a second implementation manner, the declaration information includes an identification of the first terminal.

With reference to the sixth aspect, the first implementation manner of the sixth aspect, or the second implementation manner of the sixth aspect, in a third implementation manner, the declaration information further includes a resource location and a resource size of the available resource.

With reference to the sixth aspect, the first implementation manner of the sixth aspect, the second implementation manner of the sixth aspect, or the third implementation manner of the sixth aspect, in a fourth implementation manner, the resource request information includes the identification of the second terminal.

With reference to the sixth aspect, the first implementation manner of the sixth aspect, the second implementation manner of the sixth aspect, the third implementation manner of the sixth aspect, or the fourth implementation manner of the sixth aspect, in a fifth implementation manner, the resource request information further includes a size of the available resource requested by the second terminal.

With reference to the sixth aspect, the first implementation manner of the sixth aspect, the second implementation manner of the sixth aspect, the third implementation manner of the sixth aspect, the fourth implementation manner of the sixth aspect, or the fifth implementation manner of the sixth aspect, in a sixth implementation manner, the sending, by the second terminal, resource request information to the first terminal according to the declaration information specifically includes:

sending, by the second terminal, the resource request information to the first terminal on a resource request channel according to the declaration information, where the resource request channel is a dedicated channel that is used to transmit only resource request information and that is specified in advance.

With reference to the sixth implementation manner of the sixth aspect, in a seventh implementation manner, the resource request channel is located in the first or the last subframe of each resource contention period, and the available resource is located in a subframe of the resource contention period except the first or the last subframe.

With reference to the sixth implementation manner of the sixth aspect, in an eighth implementation manner, the sending, by the second terminal, resource request information to the first terminal according to the declaration information specifically includes:

sending, by the second terminal to the first terminal according to the declaration information, resource request information that carries the identification of the first terminal.

With reference to the sixth aspect, the first implementation manner of the sixth aspect, the second implementation manner of the sixth aspect, the third implementation manner of the sixth aspect, the fourth implementation manner of the sixth aspect, or the fifth implementation manner of the sixth aspect, in a ninth implementation manner, the sending, by the second terminal, resource request information to the first terminal according to the declaration information specifically includes:

sending, by the second terminal, the resource request information to the first terminal on a resource request channel according to the declaration information, where the resource request channel is located on the available resource.

With reference to the ninth implementation manner of the sixth aspect, in a tenth implementation manner, that the resource request channel is located on the available resource specifically includes:

the resource request channel is located on the available resource in a next resource contention period adjacent to a current resource contention period.

With reference to the sixth implementation manner of the sixth aspect, the seventh implementation manner of the sixth aspect, the eighth implementation manner of the sixth aspect, the ninth implementation manner of the sixth aspect, or the tenth implementation manner of the sixth aspect, in an eleventh manner, the resource request channel is divided into at least two sub-channels, and each sub-channel is used by one second terminal to send the resource request information.

With reference to the sixth aspect, the first implementation manner of the sixth aspect, the second implementation manner of the sixth aspect, the third implementation manner of the sixth aspect, the fourth implementation manner of the sixth aspect, the fifth implementation manner of the sixth aspect, the sixth implementation manner of the sixth aspect, the seventh implementation manner of the sixth aspect, the eighth implementation manner of the sixth aspect, the ninth implementation manner of the sixth aspect, the tenth implementation manner of the sixth aspect, or the eleventh implementation manner of the sixth aspect, in a twelfth manner, the receiving, by the second terminal, response information sent by the first terminal specifically includes:

receiving, by the second terminal by using the available resource, the response information sent by the first terminal.

With reference to the sixth aspect, the first implementation manner of the sixth aspect, the second implementation manner of the sixth aspect, the third implementation manner of the sixth aspect, the fourth implementation manner of the sixth aspect, the fifth implementation manner of the sixth aspect, the sixth implementation manner of the sixth aspect, the seventh implementation manner of the sixth aspect, or the eighth implementation manner of the sixth aspect, in a thirteenth manner, the receiving, by the second terminal, response information sent by the first terminal specifically includes:

receiving, by the second terminal on the available resource in a next resource contention period adjacent to a current resource contention period, the response information sent by the first terminal.

With reference to the tenth implementation manner of the sixth aspect, in a fourteenth manner, the receiving, by the second terminal, response information sent by the first terminal specifically includes:

receiving, by the second terminal on the available resource in a next resource contention period of an adjacent resource contention period of the current resource contention period, the response information sent by the first terminal.

In the embodiments of the present invention, a first terminal sends declaration information used to indicate an available resource, receives resource request information sent by at least one second terminal according to the declaration information, and after selecting at least one third terminal from the at least one second terminal, sends response information that includes an identification of the at least one third terminal, so as to instruct the at least one third terminal to use the available resource. In comparison with the prior art, the first terminal may directly allocate an available resource to a second terminal that needs a resource, so that the second terminal does not need to blindly obtain an available resource from a resource pool by means of contention, thereby greatly reducing a delay in obtaining the available resource by the second terminal.

DETAILED DESCRIPTION

For a problem, in a contention-based distributed resource reuse method in the prior art, that a delay in obtaining an available resource by UE is long, in embodiments of the present invention, a deep research is conducted on D2D communication in the prior art.

Currently, to improve spectrum utilization and utilize a radio frequency capability of an existing terminal to a maximum extent, reusing a spectrum resource of an existing mobile communications network over a D2D communication link is taken into consideration. In order not to interfere with UE in an existing network, in D2D communication, an LTE-A downlink spectrum resource (a link from an eNB to the UE) is not used, and only an uplink spectrum resource (a link from the UE to the eNB) in an LTE-A system is reused, because in comparison, an anti-interference capability of an eNB is better than that of normal UE. There is a high probability that two UEs perform time division multiplexing on the uplink spectrum resource. In this case, simultaneous receiving and sending does not need to be supported, and it is only required that one UE performs receiving when another UE performs sending. An existing D2D scenario may be classified into three types: network coverage, partial network coverage, and no network coverage. In a scenario of network coverage, UE is in a coverage area of an eNB. In a scenario of partial network coverage, some UEs are in a coverage area of an eNB, but the other UEs are not in the coverage area of the eNB. In a scenario of no network coverage, no UE is in a coverage area of an eNB.

There are two basic methods for reusing a resource over a D2D communication link: a centralized control type method, where a resource is allocated, in a scheduling manner, to UE for use; and a contention-based distributed method such as carrier sense multiple access-collision avoidance (CSMA-CA) or carrier sense multiple access-collision detection (CSMA-CD).

Figure 1:
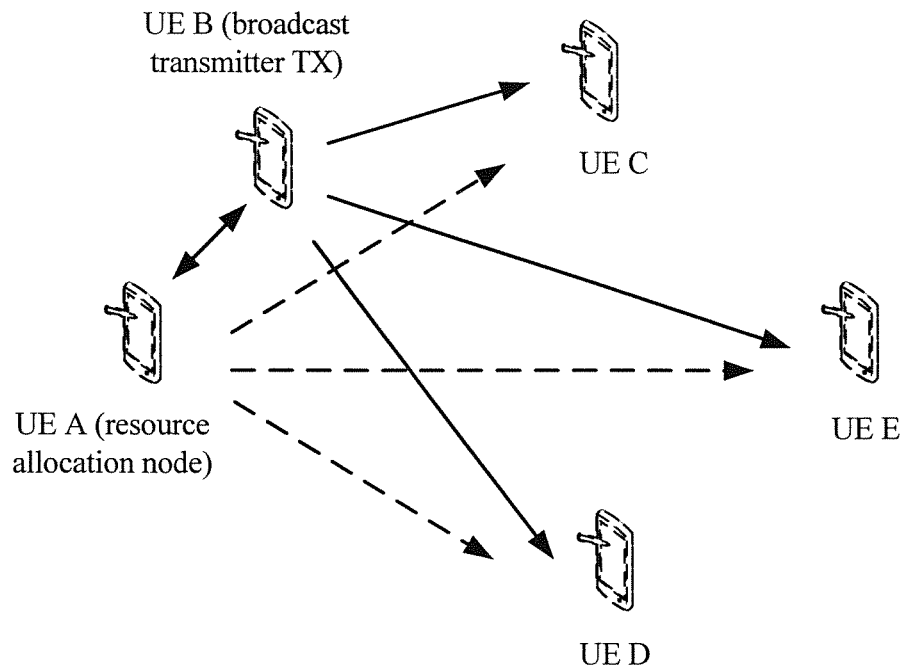
FIG. 1 is a schematic diagram of a centralized control type resource reuse manner in the prior art.

As shown in FIG. 1, in the centralized control type resource reuse method, a resource of UE is allocated by a central control device. In a scenario of no network coverage, some UEs are selected as resource allocation nodes, where the resource allocation node provides a function similar to a function of an eNB, for example, allocating a resource to UE in a group, and providing synchronization. In a scenario of network coverage, some control functions (such as synchronization) are completed by an eNB, and resource allocation may be completed by the eNB, that is, a broadcast transmitter (TX), or may be completed by another selected resource allocation node.

Figure 2:
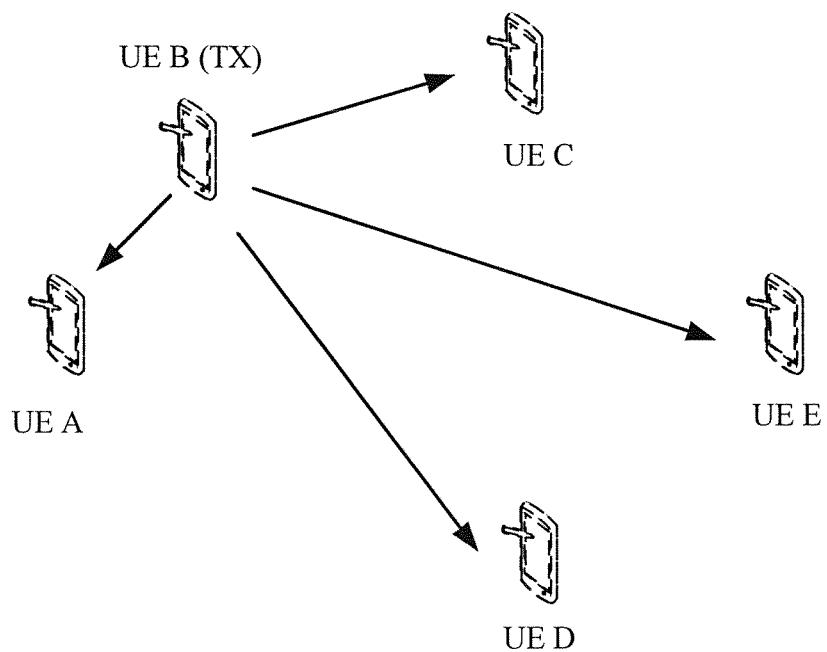
FIG. 2 is a schematic diagram of a contention-based distributed resource reuse manner in the prior art.

As shown in FIG. 2, in the contention-based distributed resource reuse method, UE obtains a resource from a resource pool by means of contention. In a scenario of network coverage, the resource pool may be a whole piece of resource allocated by an eNB, and all UEs contend for a small piece of resource from the whole piece of resource; in a scenario of no network coverage, the resource pool may be a predefined piece of system bandwidth that can be obtained by the UE, and all UEs contend for resources on the predefined system bandwidth.

Figure 3:
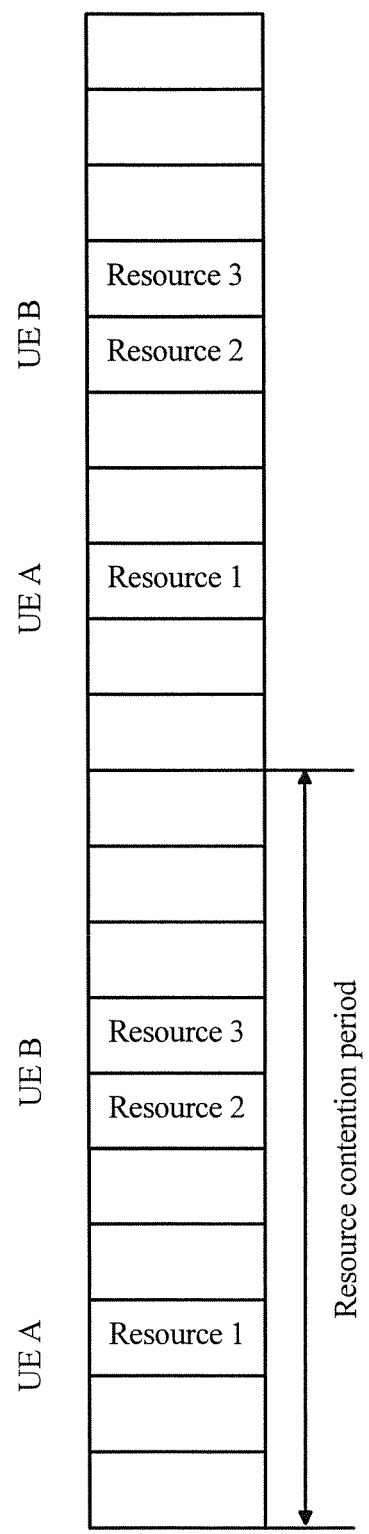
FIG. 3 is a schematic diagram of a predefined resource contention period.

UE obtains a resource from a resource pool by means of contention. First, there is a predefined resource contention period. As shown in FIG. 3, FIG. 3 is a schematic diagram of the predefined resource contention period. A resource 1, a resource 2, and a resource 3 are in an occupied (non-idle) state, where the resource 1 is occupied by UE A, the UE A sends data on the resource 1 in consecutive several resource contention periods, and the resource 1 is not released back to the resource pool until the UE A stops sending data on a resource 1 in a particular resource contention period. Likewise, the resource 2 and the resource 3 are occupied by UE B, the UE B sends data on the resource 2 and the resource 3 in consecutive several resource contention periods, and the resource 2 and the resource 3 are not released back to the resource pool until the UE B stops sending data on the resource 2 and the resource 3 in a particular resource contention period. If another UE wants to obtain a resource, the UE needs to listen for an available resource in each resource contention period, that is, a resource in an idle state. If the UE detects an available resource (a resource except the resources 1, 2, and 3 in FIG. 3) by means of listening, the UE may attempt to send data in a next resource contention period on the available resource detected by means of listening. If no conflict occurs (that is, no another UE sends data on the available resource), the UE obtains the resource by means of contention. A user who obtains the resource by means of contention may send data on the resource in consecutive several resource contention periods, and in this case, another UE learns, by means of listening, that the resource is in an occupied (non-idle) state. The resource is not released back to the resource pool until the UE stops sending data in a particular resource contention period.

From starting to listen for an available resource, to participating in resource contention, and then to obtaining a resource, it takes each UE a long time, which indicates a long contention-based access time. If a large quantity of UEs contends for a resource, a conflict probability is high, and UE needs to perform contention for many times to obtain an available resource, so that a delay in obtaining the available resource by the UE is long.

Based on the foregoing disadvantage, the embodiments of the present invention provide a resource allocation method, a resource contention method, and a related apparatus. In the technical solutions, a first terminal sends declaration information used to indicate an available resource, receives resource request information sent by at least one second terminal according to the declaration information, and after selecting at least one third terminal from the at least one second terminal, sends response information that includes an identification of the at least one third terminal, so as to instruct the at least one third terminal to use the available resource. Compared with the prior art, in one aspect, the first terminal may directly allocate an available resource to a second terminal that needs a resource, so that the second terminal does not need to blindly obtain an available resource from a resource pool by means of contention, thereby greatly reducing a delay in obtaining the available resource by the second terminal; in another aspect, the available resource does not need to be released back to the resource pool and then is obtained by a terminal that needs a resource by means of contention, but instead, an occupant directly allocates a successor for the available resource, so that a resource idle time can be effectively reduced, thereby greatly improving system resource utilization.

With reference to accompanying drawings in this specification, the following expounds main implementation principles of the technical solutions in the embodiments of the present invention, specific implementation manners, and beneficial effects that can be achieved correspondingly.

Figure 4:
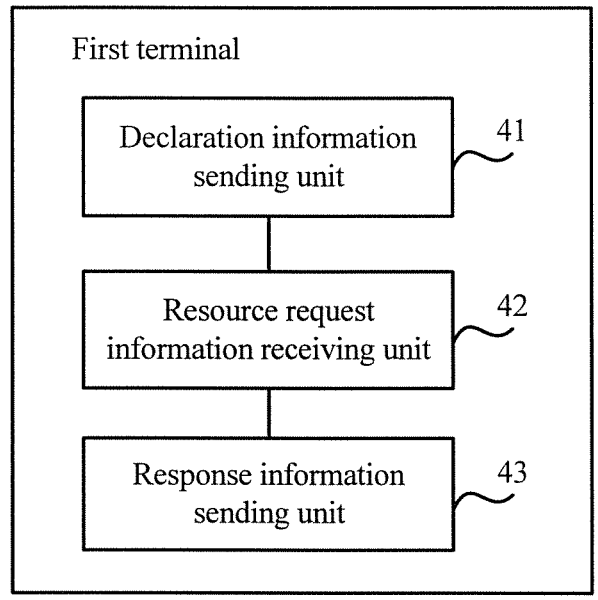
FIG. 4 is a schematic structural diagram of a first terminal according to an embodiment of the present invention.

An embodiment of the present invention provides a first terminal, which is applied to D2D communication. As shown in FIG. 4, FIG. 4 is a schematic structural diagram of the first terminal, where the first terminal includes:

a declaration information sending unit 41, configured to send declaration information used to indicate an available resource;

a resource request information receiving unit 42, configured to receive resource request information sent by at least one second terminal according to the declaration information sent by the declaration information sending unit 41; and a response information sending unit 43, configured to send response information, where the response information includes an identification of at least one third terminal, so as to instruct the at least one third terminal to use the available resource, and the at least one third terminal is selected from the at least one second terminal that sends the resource request information received by the resource request information receiving unit 42.

Optionally, the available resource is a resource obtained by the first terminal by means of contention.

Optionally, the declaration information sending unit 41 is specifically configured to:

when it is determined that the available resource needs to be transferred, send the declaration information by using the available resource.

Optionally, the declaration information may include an identification (ID) of the first terminal.

Optionally, the declaration information may further include a resource location and a resource size of the available resource.

Optionally, the resource request information may include an identification of the second terminal that requests a resource.

Optionally, the resource request information may further include a size of the available resource requested by the second terminal.

Optionally, the resource request information receiving unit 42 is specifically configured to:

receive, on a resource request channel, the resource request information sent by the at least one second terminal according to the declaration information sent by the declaration information sending unit 41, where the resource request channel is a dedicated channel that is used to transmit only resource request information and that is specified in advance.

It should be noted that the dedicated channel that is used to transmit only resource request information and that is specified in advance and the available resource are definitely located in different subframes of a resource contention period.

Optionally, the resource request channel is located in the first or the last subframe of each resource contention period, and the available resource is located in a subframe of the resource contention period except the first or the last subframe.

Optionally, the resource request information receiving unit 42 is specifically configured to:

receive resource request information that carries the identification of the first terminal and is sent by the at least one second terminal according to the declaration information sent by the declaration information sending unit 41.

Optionally, the resource request information receiving unit 42 is specifically configured to:

receive, on a resource request channel, the resource request information sent by the at least one second terminal according to the declaration information sent by the declaration information sending unit 41, where the resource request channel is located on the available resource.

Optionally, that the resource request channel is located on the available resource specifically includes:

the resource request channel is located on the available resource in a next resource contention period adjacent to a current resource contention period.

Optionally, the resource request channel is divided into at least two sub-channels, and each sub-channel is used by one second terminal to send the resource request information.

Optionally, the response information sending unit 43 is specifically configured to:

send the response information by using the available resource.

Optionally, the response information sending unit 43 is specifically configured to:

send the response information on the available resource in a next resource contention period adjacent to a current resource contention period.

Optionally, the response information sending unit 43 is specifically configured to:

send the response information on the available resource in a next resource contention period of an adjacent resource contention period of the current resource contention period.

Optionally, there are at least two third terminals; and the response information further includes:

resource sizes and resource locations of available resources separately allocated to the at least two third terminals.

Figure 5:
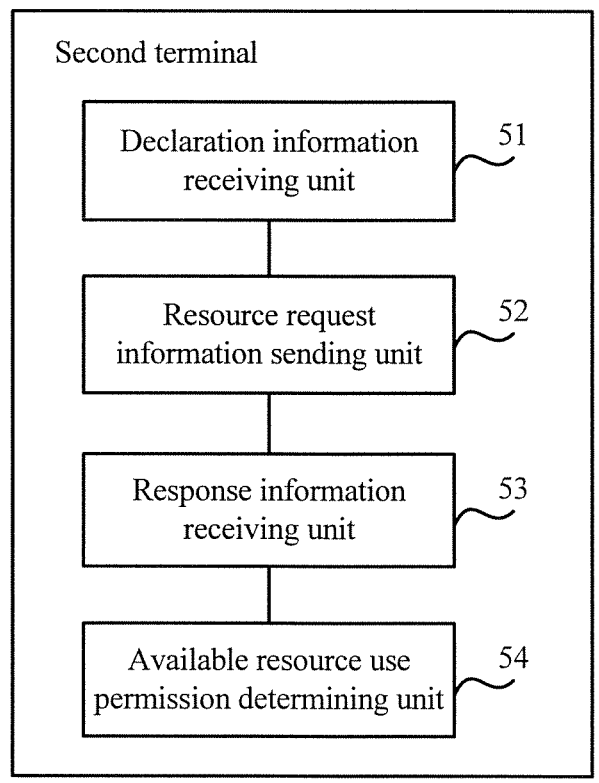
FIG. 5 is a schematic structural diagram of a second terminal according to an embodiment of the present invention.

An embodiment of the present invention further provides a second terminal, which is applied to D2D communication. As shown in FIG. 5, FIG. 5 is a schematic structural diagram of the second terminal, where the second terminal includes:

a declaration information receiving unit 51, configured to receive declaration information that is used to indicate an available resource and sent by a first terminal;

a resource request information sending unit 52, configured to send resource request information to the first terminal according to the declaration information received by the declaration information receiving unit 51, so that the first terminal can allocate the available resource to the second terminal;

a response information receiving unit 53, configured to receive response information sent by the first terminal, where the response information includes an identification of at least one third terminal selected by the first terminal from at least one second terminal that sends resource request information; and an available resource use permission determining unit 54, configured to determine, by determining whether an identification of the second terminal matches the identification that is of the at least one third terminal and included in the response information receiving unit 53, whether the second terminal can use the available resource.

Optionally, the available resource is a resource obtained by the first terminal by means of contention.

Optionally, the declaration information may include an identification of the first terminal.

Optionally, the declaration information may further include a resource location and a resource size of the available resource.

Optionally, the resource request information may include the identification of the second terminal.

Optionally, the resource request information may further include a size of the available resource requested by the second terminal.

Optionally, the resource request information sending unit 52 is specifically configured to:

send the resource request information to the first terminal on a resource request channel according to the declaration information received by the declaration information receiving unit 51, where the resource request channel is a dedicated channel that is used to transmit only resource request information and that is specified in advance.

Optionally, the resource request channel is located in the first or the last subframe of each resource contention period, and the available resource is located in a subframe of the resource contention period except the first or the last subframe.

Optionally, the resource request information sending unit 52 is specifically configured to:

send, to the first terminal according to the declaration information received by the declaration information receiving unit 51, resource request information that carries the identification of the first terminal.

Optionally, the resource request information sending unit 52 is specifically configured to:

send the resource request information to the first terminal on a resource request channel according to the declaration information received by the declaration information receiving unit 51, where the resource request channel is located on the available resource.

Optionally, that the resource request channel is located on the available resource specifically includes:

the resource request channel is located on the available resource in a next resource contention period adjacent to a current resource contention period.

Optionally, the resource request channel is divided into at least two sub-channels, and each sub-channel is used by one second terminal to send the resource request information.

Optionally, the response information receiving unit 53 is specifically configured to:

receive, by using the available resource, the response information sent by the first terminal.

Optionally, the response information receiving unit 53 is specifically configured to:

receive, on the available resource in a next resource contention period adjacent to a current resource contention period, the response information sent by the first terminal.

Optionally, the response information receiving unit 53 is specifically configured to:

receive, on the available resource in a next resource contention period of an adjacent resource contention period of the current resource contention period, the response information sent by the first terminal.

Figure 6:
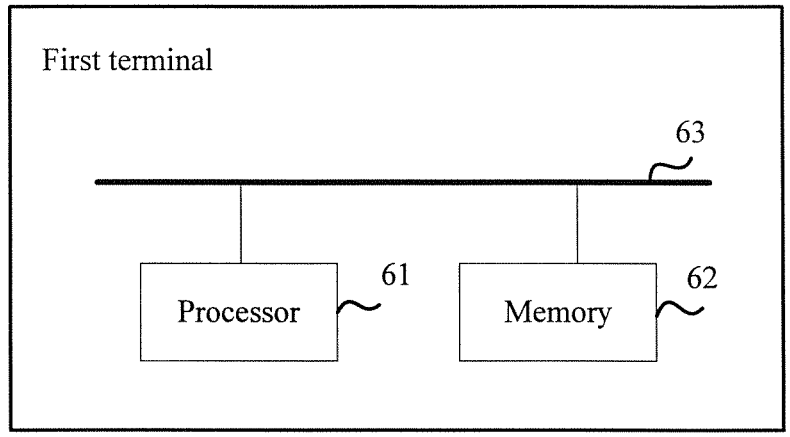
FIG. 6 is a schematic structural diagram of hardware of a first terminal according to an embodiment of the present invention.

Based on the first terminal provided above, as shown in FIG. 6, FIG. 6 is a structural diagram of hardware of a first terminal according to an embodiment of the present invention, where the first terminal includes: a processor 61, a memory 62, and a communications bus 63, and both the processor 61 and the memory 62 are connected to the communications bus 63.

The processor 61 may be a general-purpose central processing unit (CPU), a microprocessor, an application-specific integrated circuit (ASIC), or one or more integrated circuits used to control program execution of the solutions in the present invention.

The communications bus 63 may include a path in which information is transmitted between the foregoing components.

The memory 62 is connected to the processor 61, and stores program code executed by the processor 61.

The processor 61 is connected to the memory 62, and is configured to: send declaration information used to indicate an available resource; receive resource request information sent by at least one second terminal according to the declaration information; and send response information, where the response information includes an identification of at least one third terminal, so as to instruct the at least one third terminal to use the available resource, and the at least one third terminal is selected from the at least one second terminal.

Optionally, the available resource is a resource obtained by the first terminal by means of contention.

Optionally, the processor 61 is specifically configured to:

when it is determined that the available resource needs to be transferred, send the declaration information by using the available resource.

Optionally, the declaration information includes an identification of the first terminal.

Optionally, the declaration information further includes a resource location and a resource size of the available resource.

Optionally, the resource request information includes an identification of the second terminal that requests a resource.

Optionally, the resource request information further includes a size of the available resource requested by the second terminal.

Optionally, the processor 61 is specifically configured to:

receive, on a resource request channel, the resource request information sent by the at least one second terminal according to the declaration information, where the resource request channel is a dedicated channel that is used to transmit only resource request information and that is specified in advance.

Optionally, the resource request channel is located in the first or the last subframe of each resource contention period, and the available resource is located in a subframe of the resource contention period except the first or the last subframe.

Optionally, the processor 61 is specifically configured to:

receive resource request information that carries the identification of the first terminal and is sent by the at least one second terminal according to the declaration information.

Optionally, the processor 61 is specifically configured to:

receive, on a resource request channel, the resource request information sent by the at least one second terminal according to the declaration information, where the resource request channel is located on the available resource.

Optionally, that the resource request channel is located on the available resource specifically includes:

the resource request channel is located on the available resource in a next resource contention period adjacent to a current resource contention period.

Optionally, the resource request channel is divided into at least two sub-channels, and each sub-channel is used by one second terminal to send the resource request information.

Optionally, the processor 61 is specifically configured to:

send the response information by using the available resource.

Optionally, the processor 61 is specifically configured to:

send the response information on the available resource in a next resource contention period adjacent to a current resource contention period.

Optionally, the processor 61 is specifically configured to:

send the response information on the available resource in a next resource contention period of an adjacent resource contention period of the current resource contention period.

Optionally, there are at least two third terminals; and the response information further includes:

resource sizes and resource locations of available resources separately allocated to the at least two third terminals.

Figure 7:
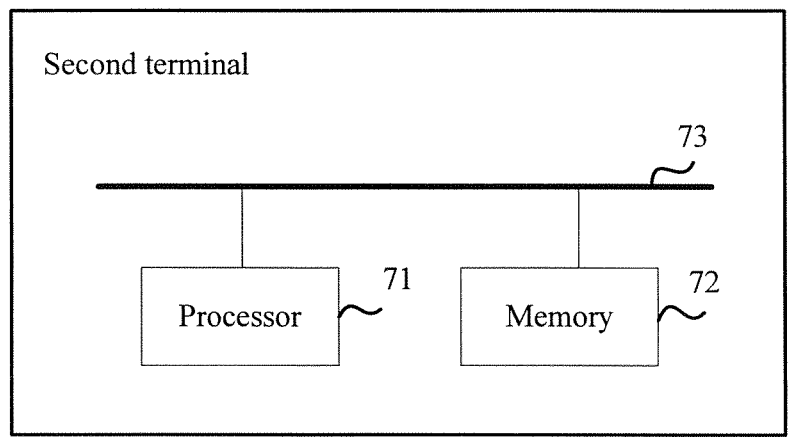
FIG. 7 is a schematic structural diagram of hardware of a second terminal according to an embodiment of the present invention.

Based on the second terminal provided above, as shown in FIG. 7, FIG. 7 is a structural diagram of hardware of a second terminal according to an embodiment of the present invention, where the second terminal includes: a processor 71, a memory 72, and a communications bus 73, and both the processor 71 and the memory 72 are connected to the communications bus 73.

The processor 71 may be a general-purpose central processing unit (CPU), a microprocessor, an application-specific integrated circuit (ASIC), or one or more integrated circuits used to control program execution of the solutions in the present invention.

The communications bus 73 may include a path in which information is transmitted between the foregoing components.

The memory 72 is connected to the processor 71, and stores program code executed by the processor 71.

The processor 71 is connected to the memory 72, and is configured to: receive declaration information that is used to indicate an available resource and sent by a first terminal; send resource request information to the first terminal according to the declaration information, so that the first terminal can allocate the available resource to the second terminal; receive response information sent by the first terminal, where the response information includes an identification of at least one third terminal selected by the first terminal from at least one second terminal that sends resource request information; and determine, by determining whether an identification of the second terminal matches the identification of the at least one third terminal, whether the second terminal can use the available resource.

Optionally, the available resource is a resource obtained by the first terminal by means of contention.

Optionally, the declaration information includes an identification of the first terminal.

Optionally, the declaration information further includes a resource location and a resource size of the available resource.

Optionally, the resource request information includes the identification of the second terminal.

Optionally, the resource request information further includes a size of the available resource requested by the second terminal.

Optionally, the processor 71 is specifically configured to:

send the resource request information to the first terminal on a resource request channel according to the declaration information, where the resource request channel is a dedicated channel that is used to transmit only resource request information and that is specified in advance.

Optionally, the resource request channel is located in the first or the last subframe of each resource contention period, and the available resource is located in a subframe of the resource contention period except the first or the last subframe.

Optionally, the processor 71 is specifically configured to:

send, to the first terminal according to the declaration information, resource request information that carries the identification of the first terminal.

Optionally, the processor 71 is specifically configured to:

send the resource request information to the first terminal on a resource request channel according to the declaration information, where the resource request channel is located on the available resource.

Optionally, that the resource request channel is located on the available resource specifically includes:

the resource request channel is located on the available resource in a next resource contention period adjacent to a current resource contention period.

Optionally, the resource request channel is divided into at least two sub-channels, and each sub-channel is used by one second terminal to send the resource request information.

Optionally, the processor 71 is specifically configured to:

receive, by using the available resource, the response information sent by the first terminal.

Optionally, the processor 71 is specifically configured to:

receive, on the available resource in a next resource contention period adjacent to a current resource contention period, the response information sent by the first terminal.

Optionally, the processor 71 is specifically configured to:

receive, on the available resource in a next resource contention period of an adjacent resource contention period of the current resource contention period, the response information sent by the first terminal.

Figure 8:
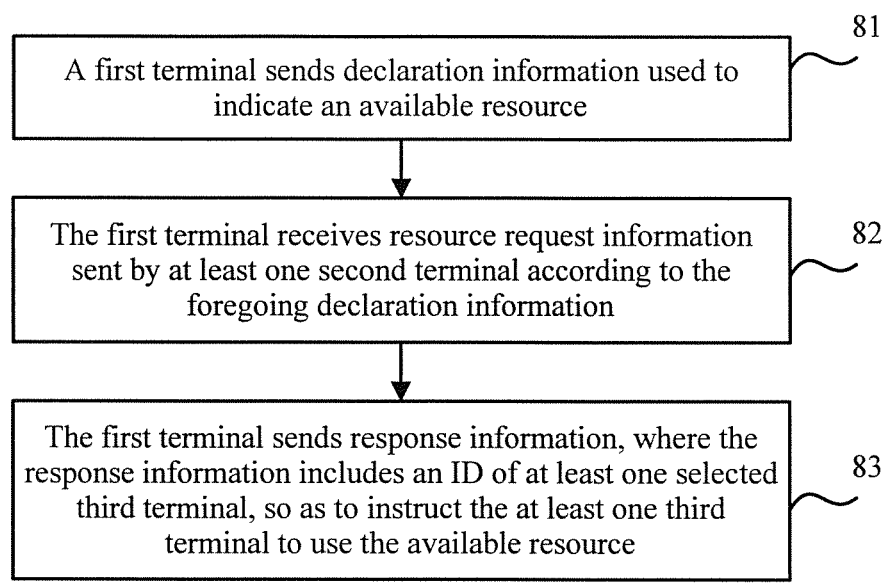
FIG. 8 is a principle flowchart of a resource allocation method according to an embodiment of the present invention.

Based on the first terminal provided above, an embodiment of the present invention further provides a resource allocation method. As shown in FIG. 8, FIG. 8 is a principle flowchart of the method, where the method is executed by a first terminal, and the first terminal may refer to any terminal that has an available resource in D2D communication. The method includes the following steps:

Step 81. A first terminal sends declaration information used to indicate an available resource.

The available resource is a resource obtained by the first terminal by means of contention, and the resource is to be released or is to expire; or the resource is to be transferred by the first terminal.

Optionally, the step may specifically include:

when it is determined that the available resource needs to be transferred, sending, by the first terminal by using the available resource, the declaration information used to indicate the available resource.

The declaration information may include an ID of the first terminal, and optionally, may further include resource information of the available resource, such as a resource location and a resource size.

Step 82: The first terminal receives resource request information sent by at least one second terminal according to the foregoing declaration information.

The resource request information may include an ID of the second terminal that request a resource, and optionally, may further include a size of the available resource requested by the second terminal. For example, only a part of the available resource may be requested.

In addition, in step 82, the resource request information may be received in but is not limited to the following manners:

A first manner:

the first terminal may receive, on a resource request channel, the resource request information sent by the at least one second terminal according to the foregoing declaration information, where the resource request channel may be a dedicated channel that is used to transmit resource request information and that is specified in advance. For example, the resource request channel is located in the first or the last subframe of each resource contention period.

In this case, the resource request information may further include the ID of the first terminal that is used when multiple first terminals simultaneously publish declaration information, the second terminal may select one of the first terminals to make a request.

A second manner:

the first terminal may receive, on a resource request channel, the resource request information sent by the at least one second terminal according to the foregoing declaration information, where the resource request channel is located on the available resource.

Optionally, the resource request channel may be located on the available resource in a next resource contention period adjacent to a current resource contention period.

Further, both the resource request channels in the foregoing two manners may be divided into at least two sub-channels, and each sub-channel is used by one second terminal to send the resource request information.

Step 83: The first terminal sends response information, where the response information includes an ID of at least one third terminal, so as to instruct the at least one third terminal to use the available resource, and the at least one third terminal is selected by the first terminal from the at least one second terminal that sends the resource request information.

The first terminal may send a response message by using the available resource of the first terminal.

Specifically, corresponding to the foregoing two implementation manners of step 82, step 83 may also be performed in the following two manners.

Based on the foregoing first implementation manner of step 82, step 83 may specifically include:

the first terminal may send the response information on the available resource in a next resource contention period adjacent to a current resource contention period.

Based on the foregoing second implementation manner of step 82, step 83 may specifically include:

the first terminal may send the response information on the available resource in a next resource contention period of an adjacent resource contention period of the current resource contention period.

In addition, if the first terminal selects at least two third terminals from the at least one second terminal in step 83, the response information may further include: resource sizes and resource locations of available resources separately allocated to the selected at least two third terminals.

Figure 9:
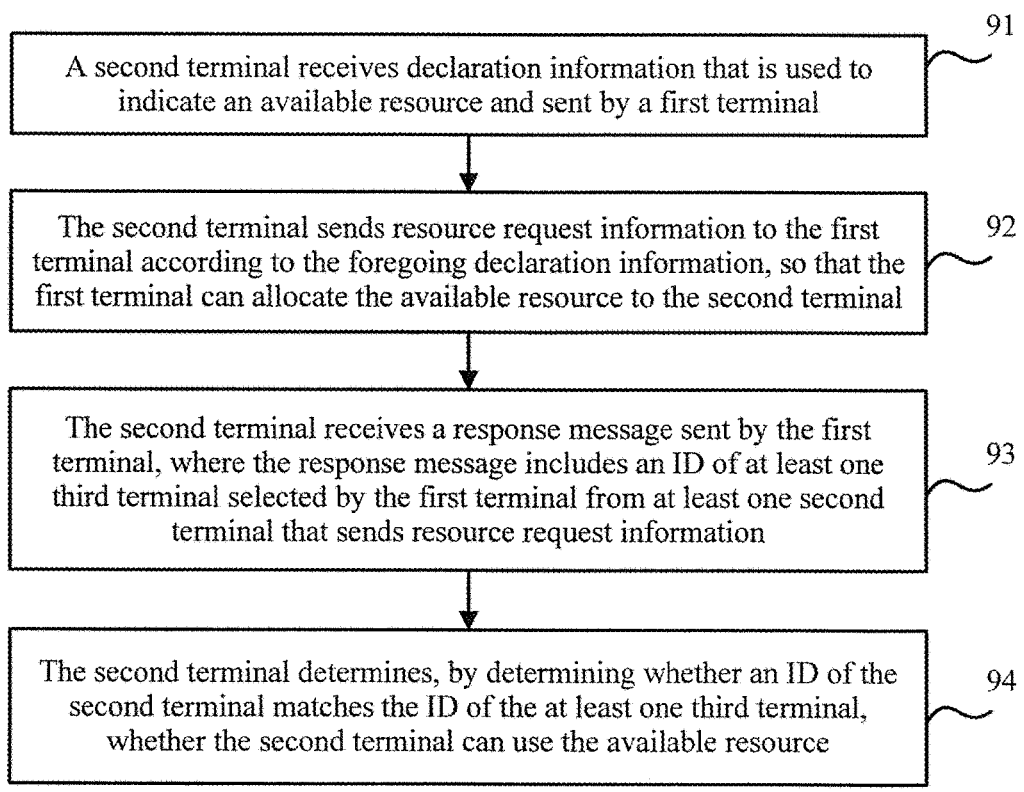
FIG. 9 is a principle flowchart of a resource contention method according to an embodiment of the present invention.

Based on the second terminal provided above, an embodiment of the present invention further provides a resource contention method. As shown in FIG. 9, FIG. 9 is a schematic diagram of implementation of the method. The method may be executed by any second terminal that needs a resource, where the second terminal interacts with the first terminal in the foregoing embodiment. The method includes the following steps:

Step 91: A second terminal receives declaration information that is used to indicate an available resource and sent by a first terminal.

The declaration information includes an ID of the first terminal that occupies the available resource. After receiving the declaration information, the second terminal learns that the first terminal has an available resource to release.

Step 92: The second terminal sends resource request information to the first terminal according to the foregoing declaration information, so that the first terminal can allocate the available resource to the second terminal.

The resource request information may include an ID of the second terminal.

Step 93: The second terminal receives response information sent by the first terminal, where the response information includes an ID of at least one third terminal selected by the first terminal from at least one second terminal that sends resource request information.

Step 94: The second terminal determines, by determining whether an ID of the second terminal matches the ID of the at least one third terminal, whether the second terminal can use the available resource.

Based on the foregoing invention principle, the following expounds an implementation process, in actual application, of the resource allocation and resource contention method provided in the present invention.

Embodiment 1

Figure 10:
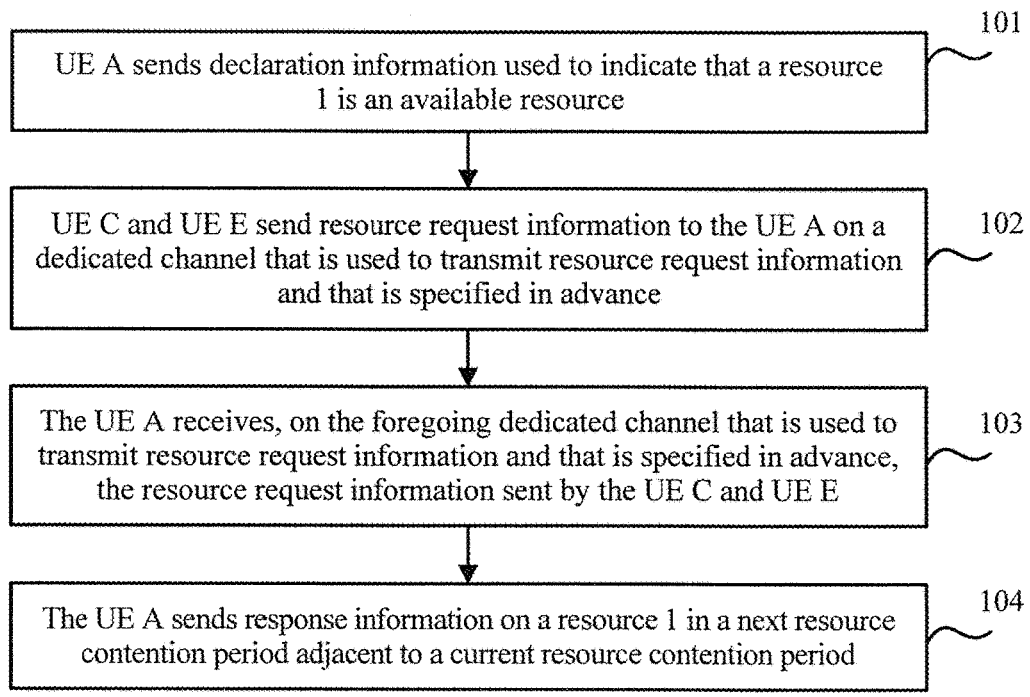
FIG. 10 is a flowchart of an implementation process of a resource allocation and resource contention method in actual application according to Embodiment 1 of the present invention.

As shown in FIG. 10, FIG. 10 is a flowchart of an implementation process of a resource allocation and resource contention method in actual application according to Embodiment 1 of the present invention. Referring to FIG. 3, the resource 1 occupied by the UE A in FIG. 3 is used as an example, and the method includes the following steps:

Step 101: UE A (which is equivalent to the first terminal mentioned above) sends declaration information used to indicate that a resource 1 is an available resource.

Specifically, when completing sending data on a resource 1 in a current resource contention period, the UE A needs to immediately release the resource 1, and the UE A may broadcast declaration information on the resource 1, so that another UE learns that the resource 1 is to be released, where the declaration information needs to include at least an ID of the UE A.

Optionally, the declaration information may further include resource information of the resource 1, such as a location of the resource 1 and a size of the resource 1.

Step 102: In other UEs such as UE B, UE C, UE D, and UE E that receive the declaration information sent by the UE A, if some UEs such as the UE C and the UE E need resources, the UE C and the UE E (which are equivalent to the second terminals mentioned above) send resource request information to the UE A on a dedicated channel that is used to transmit resource request information and that is specified in advance, where the resource request information includes at least an ID of UE that requests the resource 1.

The dedicated channel that is used to transmit resource request information and that is specified in advance is a resource request channel, and the resource request channel may be in the first or the last subframe of each resource contention period (the resource 1 is not located in the first or the last frame). The UE A is in a receiving state on the resource request channel.

Optionally, the resource request channel may be divided into multiple small sub-channels, and each UE that requests a resource may randomly send resource request information on one of the sub-channels. Specifically, contention also exists on the resource request channel: if only one UE sends resource request information on a resource request sub-channel, no conflict occurs, and the resource request information of the UE may be accurately obtained by the UE A.

Optionally, the resource request channel in Embodiment 1 is a dedicated channel specified in advance; therefore, when multiple UEs simultaneously publish declaration information, a case in which resource request information is sent to different UEs may exist on the resource request channel. To enable objects to which the UE C and the UE E send the resource request information to be clear, the resource request information may further include the ID of the UE A.

Optionally, the resource request information may further include sizes of resources that need to be requested by the UE C and the UE E (a part of the resource 1 may be requested).

Step 103: The UE A receives, on the foregoing dedicated channel that is used to transmit resource request information and that is specified in advance, the resource request information sent by the UE C and UE E.

Step 104: The UE A sends response information on a resource 1 in a next resource contention period adjacent to a current resource contention period, where the response information includes at least an ID of at least one UE allowed to use the resource 1, so as to announce a successor of the resource 1.

If the response information includes IDs of multiple successors such as the UE C and the UE E (which are equivalent to the third terminals mentioned above), the UE A needs to separately specify resources for the UE C and the UE E. For example, the UE C occupies the first half of the resource 1, and the UE E occupies the second half of the resource 1, and this resource allocation matches a minimum resource allocation granularity.

Figure 11:
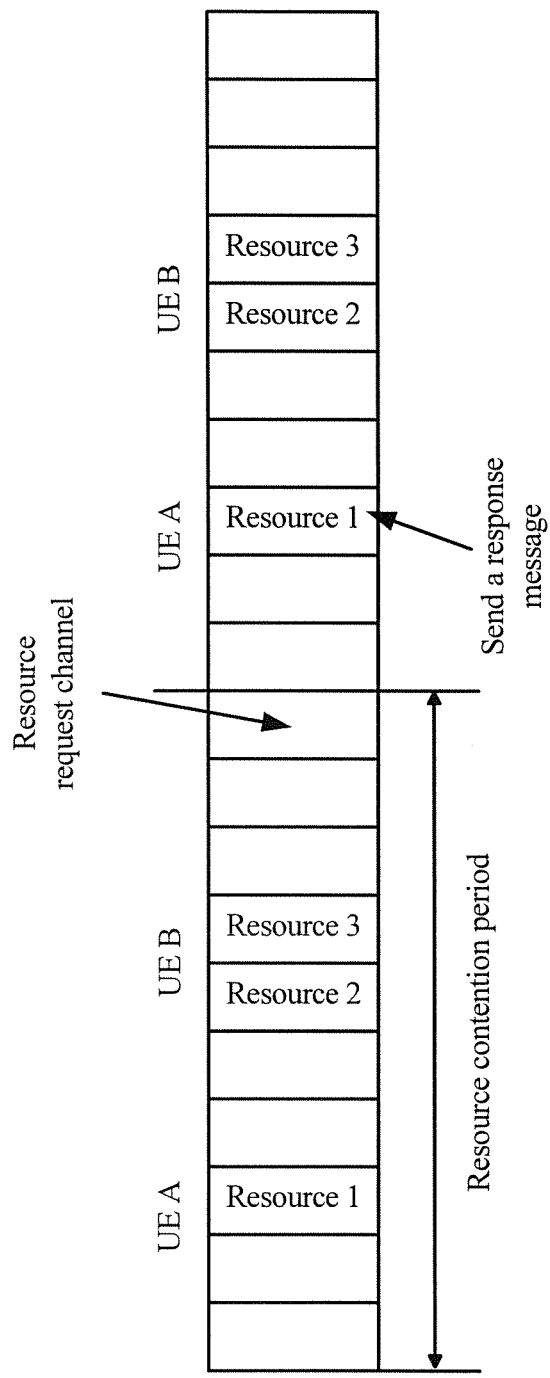
FIG. 11 is a schematic diagram of resource allocation and contention when a resource request channel is in the last subframe of each resource contention period.

As shown in FIG. 11, FIG. 11 is a schematic diagram of resource allocation and contention when a resource request channel is in the last subframe of each resource contention period. UE A receives resource request information in the last subframe of a current resource contention period, and sends response information on a resource 1 in a next resource contention period adjacent to the current resource contention period.

Embodiment 2

Figure 12:
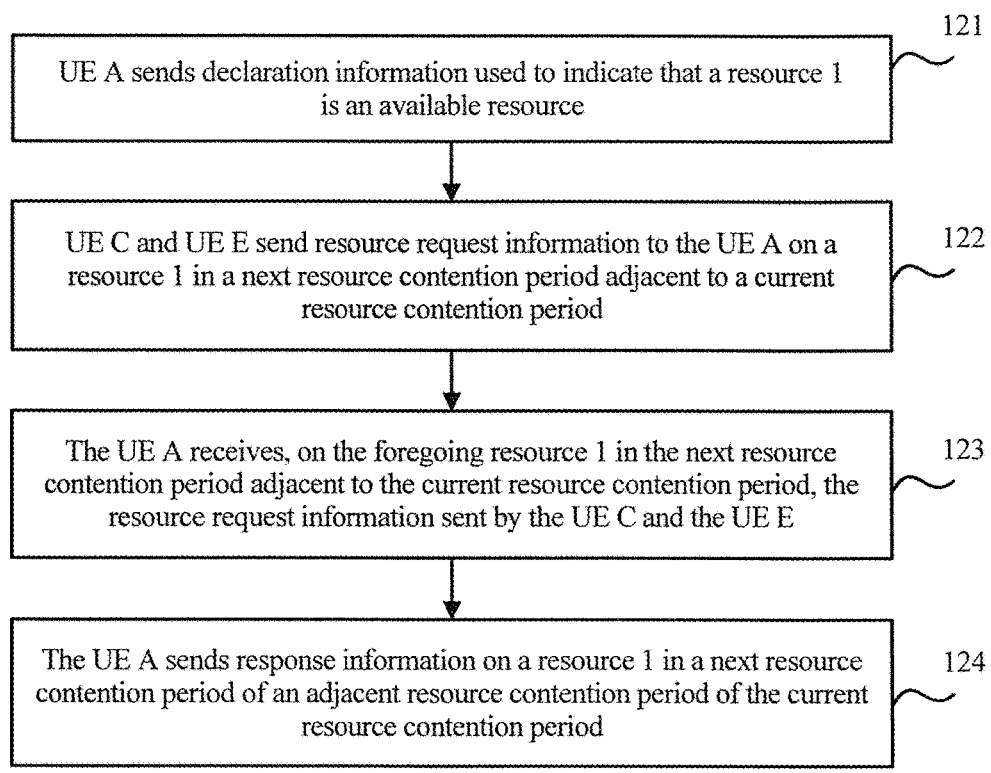
FIG. 12 is a flowchart of an implementation process of a resource allocation and resource contention method in actual application according to Embodiment 2 of the present invention.

As shown in FIG. 12, FIG. 12 is a flowchart of an implementation process of a resource allocation and resource contention method in actual application according to Embodiment 2 of the present invention. Referring to FIG. 3, the resource 1 occupied by the UE A in FIG. 3 is used as an example, and the method includes the following steps:

Step 121: UE A sends declaration information used to indicate that a resource 1 is an available resource.

Specifically, when completing sending data on a resource 1 in a current resource contention period, the UE A needs to immediately release the resource 1, and the UE A may broadcast declaration information on the resource 1, so that another UE learns that the resource 1 is to be released, where the declaration information needs to include at least an ID of the UE A.

Optionally, the declaration information may further include resource information of the resource 1, such as a location of the resource 1 and a size of the resource 1.

Step 122: In other UEs such as UE B, UE C, UE D, and UE E that receive the declaration information sent by the UE A, if some UEs such as the UE C and the UE E need resources, the UE C and the UE E send resource request information to the UE A on a resource 1 in a next resource contention period adjacent to a current resource contention period, where the resource request information includes at least an ID of UE that requests the resource 1.

The resource 1 in the next resource contention period adjacent to the current resource contention period is the resource request channel in Embodiment 2. The UE A is in a receiving state on the resource request channel.

Optionally, the resource request channel may be divided into multiple small sub-channels, and each UE that requests a resource may randomly send resource request information on one of the sub-channels. Specifically, contention also exists on the resource request channel: if only one UE sends resource request information on a resource request sub-channel, no conflict occurs, and the resource request information of the UE may be accurately obtained by the UE A.

Optionally, the resource request information may further include sizes of resources that need to be requested by the UE C and the UE E (a part of the resource 1 may be requested).

Step 123: The UE A receives, on the foregoing resource 1 in the next resource contention period adjacent to the current resource contention period, the resource request information sent by the UE C and the UE E.

Step 124: The UE A sends response information on a resource 1 in a next resource contention period of an adjacent resource contention period of the current resource contention period, where the response information includes at least an ID of at least one UE allowed to use the resource 1, so as to announce a successor of the resource 1.

If the response information includes IDs of multiple successors such as the UE C and the UE E (which are equivalent to the third UES mentioned above), the UE A needs to separately specify resources for the UE C and the UE E. For example, the UE C occupies the first half of the resource 1, and the UE E occupies the second half of the resource 1, and this resource allocation matches a minimum resource allocation granularity.

Figure 13:
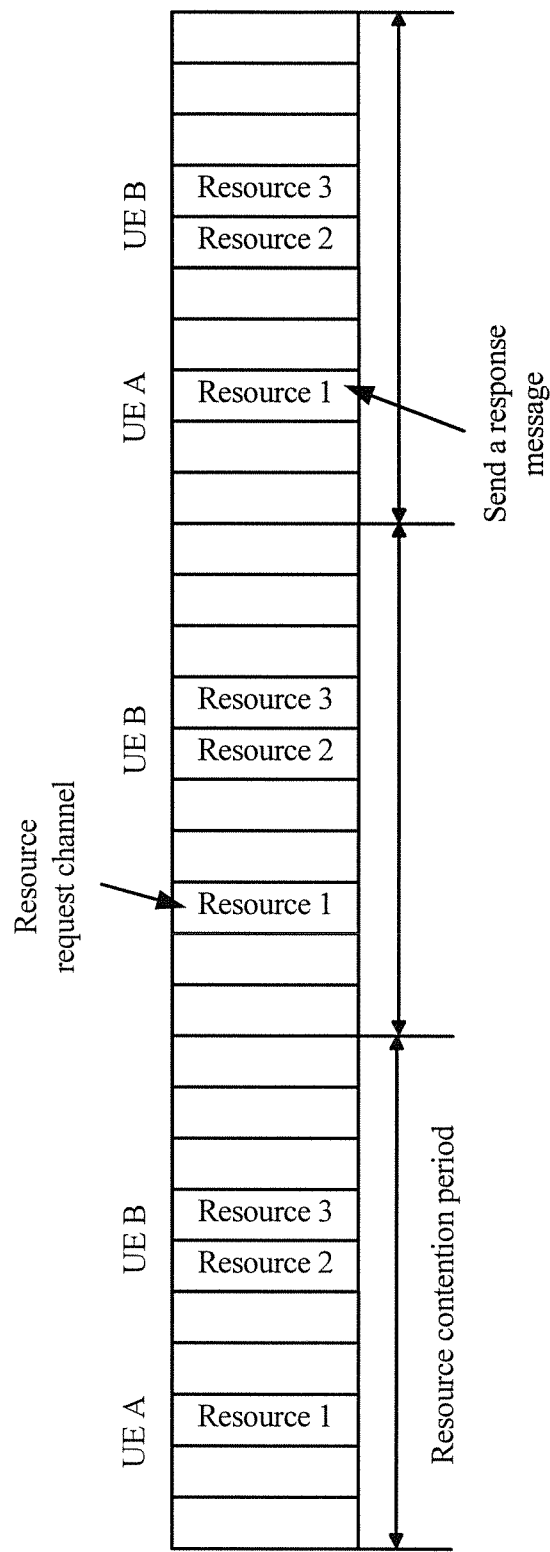
FIG. 13 is a schematic diagram of resource allocation and contention when a resource request channel is on a resource 1 in a next resource contention period adjacent to a current resource contention period.

As shown in FIG. 13, FIG. 13 is a schematic diagram of resource allocation and contention when a resource request channel is on a resource 1 in a next resource contention period adjacent to a current resource contention period. UE A receives resource request information on the resource 1 in the next resource contention period adjacent to the current resource contention period, and sends response information on a resource 1 in a next resource contention period of an adjacent resource contention period of the current resource contention period.

In comparison, foregoing Embodiment 1 and foregoing Embodiment 2 differ in setting of a resource request channel. In Embodiment 1, the first or the last subframe of each resource contention period needs to be used for resource requesting; in Embodiment 2, a resource request channel does not need to be reserved, because if no UE publishes declaration information in a current resource contention period, a reserved resource request channel is in an idle state, and is actually wasted. Therefore, in comparison, Embodiment 2 is more flexible and is more resource-saving. However, compared with Embodiment 1, Embodiment 2 also has some disadvantages, for example, one more resource contention period is required to complete resource succession.

In the foregoing two embodiments, a first terminal sends declaration information used to indicate an available resource, receives resource request information sent by at least one second terminal according to the declaration information, and after selecting at least one third terminal from the at least one second terminal, sends response information that includes an identification of the at least one third terminal, so as to instruct the at least one third terminal to use the available resource. In comparison with the prior art, the first terminal may directly allocate an available resource to a second terminal that needs a resource, so that the second terminal does not need to blindly obtain an available resource from a resource pool by means of contention, thereby greatly reducing a delay in obtaining the available resource by the second terminal.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A first user equipment (UE), applied to device-to-device (D2D) communication without forwarding by an evolved NodeB, the first UE comprising:
   memory for storing program code; and
   a processor coupled to the memory and configured to:
      obtain an available resource,
      send declaration information to at least one second UE for indicating the available resource, wherein the declaration information comprises an identification of the first UE and a resource location and a resource size of the available resource,
      receive resource request information sent by at least one second UE according to the declaration information, wherein the resource request information comprises an identification of the second UE and the size of the available resource requested by the second UE,
      send response information to the at least one second UE by using the available resource for instructing the at least one second UE to use the available resource, and
      receive, on a resource request channel, the resource request information sent by the at least one second UE according to the declaration information, wherein the resource request channel is a dedicated channel that is used to transmit only resource request information and that is specified in advance, the resource request channel is located in the first or the last subframe of each resource contention period, and the available resource is located in a subframe of the resource contention period except the first or the last subframe.

2. A first user equipment (UE), applied to device-to-device (D2D) communication without forwarding by an evolved NodeB, the first UE comprising:
   memory for storing program code; and
   a processor coupled to the memory and configured to:
      obtain an available resource,
      send declaration information to at least one second UE for indicating the available resource, wherein the declaration information comprises an identification of the first UE and a resource location and a resource size of the available resource,
      receive resource request information sent by at least one second UE according to the declaration information, wherein the resource request information comprises an identification of the second UE and the size of the available resource requested by the second UE,
      send response information to the at least one second UE by using the available resource for instructing the at least one second UE to use the available resource, and
      receive, on a resource request channel, the resource request information sent by the at least one second UE according to the declaration information, wherein the resource request channel is located on the available resource in a resource contention period adjacent to a current resource contention period.

3. The first UE according to claim 2, wherein the resource request channel is divided into at least two sub-channels, and each sub-channel is used by one second UE to send the resource request information.

4. A first user equipment (UE), applied to device-to-device (D2D) communication without forwarding by an evolved NodeB, the first UE comprising:

memory for storing program code; and
a processor coupled to the memory and configured to:
  obtain an available resource,
    send declaration information to at least one second UE for indicating the available resource, wherein the declaration information comprises an identification of the first UE and a resource location and a resource size of the available resource,
    receive resource request information sent by at least one second UE according to the declaration information, wherein the resource request information comprises an identification of the second UE and the size of the available resource requested by the second UE,
    send response information to the at least one second UE by using the available resource for instructing the at least one second UE to use the available resource, and
    send the response information on the available resource in a resource contention period adjacent to a current resource contention period or in a next resource contention period of an adjacent resource contention period of the current resource contention period.

5. The first UE according to claim 4, wherein the response information further comprises:
resource sizes and resource locations of available resources separately allocated to at least two second UEs.

6. A second user equipment (UE), applied to device-to-device (D2D) communication without forwarding by an evolved NodeB, the second UE comprising:
memory for storing program code; and
a processor coupled to the memory and configured to:
  receive declaration information from a first UE for indicating an available resource, wherein the declaration information comprises an identification of the first UE and a resource location and a resource size of the available resource,
  send resource request information to the first UE for requesting the first UE to allocate the available resource to the second UE according to the declaration information, wherein the resource request information comprises an identification of the second UE and the size of the available resource requested by the second UE,
  receive response information from the first UE by using the available resource, wherein the response information comprises an identification of at least one third UE, and
  determine, when the identification of the second UE matches the identification of the at least one third UE, that the second UE can use the available resource, and
  send the resource request information to the first UE on a resource request channel according to the declaration information, wherein the resource request channel is a dedicated channel that is used to transmit only resource request information and that is specified in advance, the resource request channel is located in the first or the last subframe of each resource contention period, and the available resource is located in a subframe of the resource contention period except the first or the last subframe.

7. A second user equipment (UE), applied to device-to-device (D2D) communication without forwarding by an evolved NodeB, the second UE comprising:
memory for storing program code; and
a processor coupled to the memory and configured to:
  receive declaration information from a first UE for indicating an available resource, wherein the declaration information comprises an identification of the first UE and a resource location and a resource size of the available resource,
  send resource request information to the first UE for requesting the first UE to allocate the available resource to the second UE according to the declaration information, wherein the resource request information comprises an identification of the second UE and the size of the available resource requested by the second UE,
  receive response information from the first UE by using the available resource, wherein the response information comprises an identification of at least one third UE, and
  determine, when the identification of the second UE matches the identification of the at least one third UE, that the second UE can use the available resource, and
  send the resource request information to the first UE on a resource request channel according to the declaration information, wherein the resource request channel is located on the available resource in a resource contention period adjacent to a current resource contention period.

8. The second UE according to claim 7, wherein the resource request channel is divided into at least two sub-channels, and each sub-channel is used by one second UE to send the resource request information.

9. A second user equipment (UE), applied to device-to-device (D2D) communication without forwarding by an evolved NodeB, the second UE comprising:
memory for storing program code; and
a processor coupled to the memory and configured to:
  receive declaration information from a first UE for indicating an available resource, wherein the declaration information comprises an identification of the first UE and a resource location and a resource size of the available resource,
  send resource request information to the first UE for requesting the first UE to allocate the available resource to the second UE according to the declaration information, wherein the resource request information comprises an identification of the second UE and the size of the available resource requested by the second UE,
  receive response information from the first UE by using the available resource, wherein the response information comprises an identification of at least one third UE,
  determine, when the identification of the second UE matches the identification of the at least one third UE, that the second UE can use the available resource, and
  receive, on the available resource in a resource contention period adjacent to a current resource contention period or in a next resource contention period of an adjacent resource contention period of the current resource contention period, the response information sent by the first UE.

10. A resource allocation method, applied to device-to-device (D2D) communication without forwarding by an evolved NodeB, the method comprising:

obtaining, by a first user equipment (UE), an available resource;

sending, by the first (UE), declaration information to at least one second UE for indicating the available resource, wherein the declaration information comprises an identification of the first UE and a resource location and a resource size of the available resource;

receiving, by the first UE, resource request information sent by at least one second UE according to the declaration information, wherein the resource request information comprises an identification of the second UE that requests a resource and a size of the available resource requested by the second UE;

sending, by the first UE by using the available resource, response information to the at least one second UE for instructing the second UE to use the available resource; and wherein receiving, by the first UE, resource request information sent by at least one second UE according to the declaration information comprises:

receiving, by the first UE on a resource request channel, the resource request information sent by the at least one second UE according to the declaration information, wherein the resource request channel is a dedicated channel that is used to transmit only resource request information and that is specified in advance, the resource request channel is located in the first or the last subframe of each resource contention period, and the available resource is located in a subframe of the resource contention period except the first or the last subframe.

11. A resource allocation method, applied to device-to-device (D2D) communication without forwarding by an evolved NodeB, the method comprising:

obtaining, by a first user equipment (UE), an available resource;

sending, by the first (UE), declaration information to at least one second UE for indicating the available resource, wherein the declaration information comprises an identification of the first UE and a resource location and a resource size of the available resource;

receiving, by the first UE, resource request information sent by at least one second UE according to the declaration information, wherein the resource request information comprises an identification of the second UE that requests a resource and a size of the available resource requested by the second UE;

sending, by the first UE by using the available resource, response information to the at least one second UE for instructing the second UE to use the available resource; and wherein receiving, by the first UE, resource request information sent by at least one second UE according to the declaration information comprises:

receiving, by the first UE on a resource request channel, the resource request information sent by the at least one second UE according to the declaration information, wherein the resource request channel is located on the available resource in a resource contention period adjacent to a current resource contention period.

12. A resource allocation method, applied to device-to-device (D2D) communication without forwarding by an evolved NodeB, the method comprising:

obtaining, by a first user equipment (UE), an available resource;

sending, by the first (UE), declaration information to at least one second UE for indicating the available resource, wherein the declaration information comprises an identification of the first UE and a resource location and a resource size of the available resource;

receiving, by the first UE, resource request information sent by at least one second UE according to the declaration information, wherein the resource request information comprises an identification of the second UE that requests a resource and a size of the available resource requested by the second UE;

sending, by the first UE by using the available resource, response information to the at least one second UE for instructing the second UE to use the available resource; and wherein sending, by the first UE, response information comprises:

sending, by the first UE, the response information on the available resource in a resource contention period adjacent to a current resource contention period or in a next resource contention period of an adjacent resource contention period of the current resource contention period.

13. A resource allocation method, applied to device-to-device (D2D) communication without forwarding by an evolved NodeB, the method comprising:

obtaining, by a first user equipment (UE), an available resource;

sending, by the first (UE), declaration information to at least one second UE for indicating the available resource, wherein the declaration information comprises an identification of the first UE and a resource location and a resource size of the available resource;

receiving, by the first UE, resource request information sent by at least one second UE according to the declaration information, wherein the resource request information comprises an identification of the second UE that requests a resource and a size of the available resource requested by the second UE;

sending, by the first UE by using the available resource, response information to the at least one second UE for instructing the second UE to use the available resource; and wherein the response information further comprises resource sizes and resource locations of available resources separately allocated to at least two third UEs.

14. A resource contention method, applied to device-to-device (D2D) communication without forwarding by an evolved NodeB, the method comprising:

receiving, by a second user equipment (UE), declaration information from a first UE for indicating an available resource, wherein the available resource is a resource obtained by the first UE by means of contention, and wherein the declaration information comprises an identification of the first UE and a resource location and a resource size of the available resource;

sending, by the second UE, resource request information to the first UE for requesting the first UE to allocate the available resource to the second UE according to the declaration information, wherein the resource request information comprises an identification of the second UE and the size of the available resource requested by the second UE;

receiving, by the second UE by using the available resource, response information sent by the first UE, wherein the response information comprises an identification of at least one third UE;

determining, by the second UE, when the identification of the second UE matches the identification of the at least one third UE, that the second UE can use the available resource; and wherein sending, by the second UE, resource request information to the first UE according to the declaration information comprises:

sending, by the second UE, the resource request information to the first UE on a resource request channel according to the declaration information, wherein the resource request channel is a dedicated channel that is used to transmit only resource request information and that is specified in advance, the resource request channel is located in the first or the last subframe of each resource contention period, and the available resource is located in a subframe of the resource contention period except the first or the last subframe.

15. A resource contention method, applied to device-to-device (D2D) communication without forwarding by an evolved NodeB, the method comprising:

receiving, by a second user equipment (UE), declaration information from a first UE for indicating an available resource, wherein the available resource is a resource obtained by the first UE by means of contention, and wherein the declaration information comprises an identification of the first UE and a resource location and a resource size of the available resource;

sending, by the second UE, resource request information to the first UE for requesting the first UE to allocate the available resource to the second UE according to the declaration information, wherein the resource request information comprises an identification of the second UE and the size of the available resource requested by the second UE;

receiving, by the second UE by using the available resource, response information sent by the first UE, wherein the response information comprises an identification of at least one third UE;

determining, by the second UE, when the identification of the second UE matches the identification of the at least one third UE, that the second UE can use the available resource; and wherein sending, by the second UE, resource request information to the first UE according to the declaration information comprises:

sending, by the second UE, the resource request information to the first UE on a resource request channel according to the declaration information, wherein the resource request channel is located on the available resource, the resource request channel is located on the available resource in a resource contention period adjacent to a current resource contention period.

16. The method according to claim 15, wherein the resource request channel is divided into at least two sub-channels, and each sub-channel is used by one second UE to send the resource request information.

17. A resource contention method, applied to device-to-device (D2D) communication without forwarding by an evolved NodeB, the method comprising:

receiving, by a second user equipment (UE), declaration information from a first UE for indicating an available resource, wherein the available resource is a resource obtained by the first UE by means of contention, and wherein the declaration information comprises an identification of the first UE and a resource location and a resource size of the available resource;

sending, by the second UE, resource request information to the first UE for requesting the first UE to allocate the available resource to the second UE according to the declaration information, wherein the resource request information comprises an identification of the second UE and the size of the available resource requested by the second UE;

receiving, by the second UE by using the available resource, response information sent by the first UE, wherein the response information comprises an identification of at least one third UE;

determining, by the second UE, when the identification of the second UE matches the identification of the at least one third UE, that the second UE can use the available resource; and wherein receiving, by the second UE, response information sent by the first UE comprises:

receiving, by the second UE on the available resource in a resource contention period adjacent to a current resource contention period or in a next resource contention period of an adjacent resource contention period of the current resource contention period, the response information sent by the first UE.

* * * * *